(12) United States Patent
Cowan et al.

(10) Patent No.: US 10,941,520 B2
(45) Date of Patent: *Mar. 9, 2021

(54) FRACTIONATING AND REFINING SYSTEM FOR ENGINEERING FIBERS TO IMPROVE PAPER PRODUCTION

(71) Applicant: Pulmac Systems International, Inc., Williston, VT (US)

(72) Inventors: Joffrey Dard Cowan, South Burlington, VT (US); Wavell Fredrick Cowan, Montpelier, VT (US); Robert Joseph White, Williston, VT (US)

(73) Assignee: Pulmac Systems International, Inc., Williston, VT (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/024,194

(22) Filed: Jun. 29, 2018

(65) Prior Publication Data

US 2018/0313034 A1 Nov. 1, 2018

Related U.S. Application Data

(60) Continuation-in-part of application No. 15/895,040, filed on Feb. 13, 2018, now Pat. No. 10,400,394,
(Continued)

(51) Int. Cl.
*D21D 5/24* (2006.01)
*D21D 1/20* (2006.01)
(Continued)

(52) U.S. Cl.
CPC .............. *D21D 5/24* (2013.01); *D21D 1/20* (2013.01); *D21G 9/0018* (2013.01);
(Continued)

(58) Field of Classification Search
CPC .......................... D21G 9/0018; D21H 5/2628
See application file for complete search history.

(56) References Cited

U.S. PATENT DOCUMENTS 3,802,964 A 4/1974 Forgacs et al.
3,873,416 A 3/1975 Forgacs et al.
(Continued)

FOREIGN PATENT DOCUMENTS

CN 102242511 A 11/2011
DE 102006020215 A1 11/2007
(Continued)

OTHER PUBLICATIONS

Smook, Handbook for Pulp and Paper Technologists, 1992, Angus Wilde Publications, 2nd edition, chapter 16. (Year: 1992).*
(Continued)

*Primary Examiner* — Anthony Calandra
(74) *Attorney, Agent, or Firm* — Thomas G. Ference

(57) ABSTRACT

A system for treating cellulosic fibers to improve paper, board and tissue quality; the system involves splitting fibers into an original portion having original fibers and a refinable portion. The refinable portion may further be fractionated by one or more fibers properties by a fiber fractionation system into a first fraction and a second fraction. The refinable portion as a whole, or a fractionated fraction thereof, is then refined to produce refined fibers. Varying amounts of the original unrefined fibers, refined fibers and possibly additionally fractionated unrefined fibers are blended together to form an optimized slurry that is processed by a paper machine into an optimized paper product. A master control system, fiber measurement system and optional fractionation maintenance system may be integrated with the overall system to regulate all processing.

6 Claims, 40 Drawing Sheets

Related U.S. Application Data which is a division of application No. 15/242,501, filed on Aug. 20, 2016, now Pat. No. 10,041,209.

(60) Provisional application No. 62/208,355, filed on Aug. 21, 2015.

(51) Int. Cl.
| | |
|---|---|
| *G01N 29/036* | (2006.01) |
| *D21G 9/00* | (2006.01) |
| *G01N 29/44* | (2006.01) |
| *G01N 29/46* | (2006.01) |
| *G01N 29/14* | (2006.01) |

(52) U.S. Cl.
CPC ........... *G01N 29/036* (2013.01); *G01N 29/14* (2013.01); *G01N 29/4427* (2013.01); *G01N 29/46* (2013.01); *G01N 2291/02416* (2013.01)

(56) References Cited

U.S. PATENT DOCUMENTS

| | | | |
|---|---|---|---|
| 4,292,122 A | 9/1981 | Kamis et al. | |
| 4,342,618 A | 8/1982 | Kamis et al. | |
| 4,514,257 A | 4/1985 | Karlsson et al. | |
| 4,562,969 A | 1/1986 | Lindahl | |
| 4,609,432 A | 9/1986 | Brucato | |
| 4,704,201 A | 11/1987 | Keck et al. | |
| 4,776,926 A | 10/1988 | Lindahl | |
| 4,886,576 A | 12/1989 | Sloan | |
| 4,892,619 A | 1/1990 | Tistad | |
| 5,131,980 A | 7/1992 | Chamlee et al. | |
| 5,133,832 A | 7/1992 | Gilkey | |
| 6,361,650 B1 | 3/2002 | Danielsson et al. | |
| 6,440,272 B1 | 8/2002 | Binder et al. | |
| 6,491,792 B2 | 12/2002 | Shakespeare et al. | |
| 6,517,680 B1 | 2/2003 | Werner et al. | |
| 6,746,572 B2 | 6/2004 | Schwartz | |
| 6,846,381 B2 | 1/2005 | Jussila et al. | |
| 7,077,930 B2 | 7/2006 | Ammala et al. | |
| 7,083,049 B2 | 8/2006 | Schabel | |
| 7,289,210 B2 | 10/2007 | Jang | |
| 7,381,295 B2 | 6/2008 | Kokkonen | |
| 7,407,563 B2 | 8/2008 | Hietaniemi | |
| 7,972,476 B2 | 7/2011 | Scherb et al. | |
| 8,262,680 B2 | 9/2012 | Ring | |
| 8,679,293 B2 | 3/2014 | Ding et al. | |
| 8,764,936 B2 | 7/2014 | Laurila-Lumme et al. | |
| 8,877,010 B2 | 11/2014 | Saren | |
| 8,926,793 B2 | 1/2015 | Goto et al. | |
| 9,039,272 B2 | 5/2015 | Karki | |
| 9,879,361 B2 | 1/2018 | Pande et al. | |
| 2004/0011483 A1 | 1/2004 | Hautala et al. | |
| 2006/0289140 A1 | 12/2006 | Park et al. | |
| 2008/0029232 A1 | 2/2008 | Wikdahl | |
| 2009/0301674 A1 | 12/2009 | Niinimaki | |
| 2017/0073893 A1 | 3/2017 | Bilodeau et al. | |
| 2018/0092397 A1 | 4/2018 | Pesendorter et al. | |
| 2018/0135246 A1 | 5/2018 | Crossley et al. | |

FOREIGN PATENT DOCUMENTS

| | | | | |
|---|---|---|---|---|
| DE | 102015105882 A1 | * | 10/2016 | ............ D21H 27/00 |
| EP | 1889971 A1 | | 2/2008 | |
| EP | 2009176 A2 | | 12/2008 | |
| SU | 444848 A1 | | 9/1974 | |
| WO | 9107231 A1 | | 5/1991 | |
| WO | 2006108508 A1 | | 10/2006 | |
| WO | 200706318 A2 | | 6/2007 | |
| WO | 2009000348 A1 | | 12/2008 | |
| WO | 2009077001 A1 | | 6/2009 | |

OTHER PUBLICATIONS

Tappi, Consistency Measurement and Control in a Tissue Mill, 2011, PaperCon.
Smook, Handbook for Pulp and Paper Technologists, 1992, Angus Wilde Publications, 2nd Edition, Chapter 9.
Herbert Sixta "Handbook of Pulp", 2006 rozt, Wiley-VCH Verlag GmbH &Co. KGaA, Weinheim, ISBN 978-3-527-30999-3, "5.2.1.2 Fiber Fractionation by Screening", "6.6.1 Screening and Cleaning Efficiency", "7.1 General Principles", "7.2.5.3 Pressurized Reactors", 7.5.5.3 Effect of Pulp Consistency "11.3.2.3 Supramolecular Structure", fig. 4.24.

* cited by examiner

Fiber Fractionation

Thin Walled Fiber

Thick Walled Fiber

Fiber Measurment

Fiber Wall Thickness Measurment with RGB Circular Polarized Light

Fiber Wall Thickness Distribution of Fractionated Pulp

Fiber Refining

Unrefined Fiber

Refined Fiber

Crill Measurment $$\text{Crill Bonding Area} = \frac{\text{UV Absorption}}{\text{IR Absorption}}$$

Crill Bonding Area Before and After Refining

Static Fiber Processing Flow
Example 1

| Step 1<br>Original Fibers/Slurry | Step 2<br>Splitting Slurry | Step 3<br>Fractionation | Step 4<br>Refinery | Step 5<br>Blending | Step 6<br>Optimized Fibers/Slurry |
|---|---|---|---|---|---|
| Original Slurry<br>122<br>100% | Fractionable Portion<br>126<br>50% | Heavies Fraction 155<br>Heavy Fibers 118c<br>15% | Refined Portion 140<br>Refined Fibers (Heavies) 118d<br>15% | Refined Fibers (Heavies)<br>118d<br>15%<br>+<br>Light Fibers<br>118b<br>35%<br>+<br>Original Fibers<br>118a<br>50% | Optimized Slurry<br>139<br>100% |
|  |  | Lights Fraction 153<br>Light Fibers 118b<br>35% | Non-Refined Portion 138<br>Light Fibers 118b<br>35% |  |  |
|  | Original Portion<br>128<br>50% | Original Portion<br>128<br>50% | Original Portion<br>128<br>50% |  |  |

Figure 12

Dynamic Fiber Processing Flow
Example 2

| Step 1 | Step 2 | Step 3 | Step 4 | Step 5 | Step 6 | Step 7 |
|---|---|---|---|---|---|---|
| Original Fibers/ Slurry | Splitting Slurry | Fractionation | Refinery | Capacitance | Blending | Optimized Fibers/ Slurry |
| Original Slurry 122 100% | Fractionable Portion 126 45-55% | Heavies Fraction 155 <br> Heavy Fibers 118c <br> 13.5-16.5% <br><br> Lights Fraction 153 <br> Light Fibers 118b <br> 33.5-36.5% | Refined Portion 140 <br> Refined Fibers (Heavies) 118d <br> 13.5-16.5% <br><br> Non-Refined Portion 138 <br> Light Fibers 118b <br> 33.5-36.5% | Refined Portion 140 <br> Refined Fibers (Heavies) 118d <br> 13.5-16.5% <br><br> Non-Refined Portion 138 <br> Light Fibers 118b <br> 33.5-36.5% | Refined Fibers (Heavies) 118d 13.5-16.5% <br> + <br> Light Fibers 118b 33.5-36.5% <br> + <br> Original Fibers 118a 45-55% | Optimized Slurry 139 100% |
| | Original Portion 128 45-55% | Original Portion 128 45-55% | Original Portion 128 45-55% | Original Portion 128 45-55% | | |

Figure 13

Static Fiber Processing Flow
Example 3

| Step 1<br>Original Fibers/Slurry | Step 2<br>Splitting Slurry | Step 3<br>Refinery | Step 4<br>Blending | Step 5<br>Optimized Fibers/Slurry |
|---|---|---|---|---|
| Original Slurry<br>122<br>100% | Refinable Portion<br>160<br>15% | Refined Portion 140<br>Refined Fibers 118d<br>15% | Refined Fibers<br>118d<br>15%<br>+<br>Original Fibers<br>118a<br>85% | Optimized Slurry<br>139<br>100% |
| | Original Portion<br>128<br>85% | Original Portion<br>128<br>85% | | |

Figure 15

Dynamic Fiber Processing Flow
Example 4

| Step 1 | Step 2 | Step 3 | Step 4 | Step 5 | Step 6 |
|---|---|---|---|---|---|
| Original Fibers/ Slurry | Splitting Slurry | Refinery | Capacitance | Blending | Optimized Fibers/ Slurry |
| Original Slurry 122 100% | Refinable Portion 160 10-20% | Refined Portion 140 Refined Fibers 118d 10-20% | Refined Portion 140 Refined Fibers 118d 10-20% | Refined Fibers 118d 10-20% + Original Fibers 118a 80-90% | Optimized Slurry 139 100% |
| | Original Portion 128 80-90% | Original Portion 128 80-90% | Original Portion 128 80-90% | | |

Figure 16

Exemplary Process Parameters
Table 1

| System | Samples | Fractionation | % Mixtures | | Refining |
|---|---|---|---|---|---|
| | | | Feed | Refined | Revs (1000) |
| 20a | A | Fractionated | 85 | 15 | 5 |
| 20a | B | Fractionated | 85 | 15 | 10 |
| 20a | C | Fractionated | 70 | 30 | 3 |
| 20a | D | Fractionated | 70 | 30 | 4 |
| 20a | E | Fractionated | 70 | 30 | 5 |
| 20b | F | Unfractionated | 75 | 25 (Feed) | 5 |
| 20a | G | Fractionated | 75 | 25 | 10 |
| 20a | H | Fractionated | 75 | 25 | 10 |
| Conventional | I | Unfractionated | - | 100 | 0 |
| Conventional | J | Unfractionated | - | 100 | 1 |
| Conventional | K | Unfractionated | - | 100 | 2.5 |
| Conventional | L | Unfractionated | - | 100 | 5 |
| Conventional | M | Unfractionated | - | 100 | 7.5 |

Figure 17

Process Flow for Conventional System
119
Slurry for Bonding and Structural Material
⇩
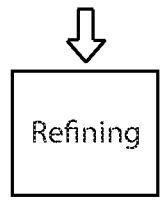
Refining
⇩
Bonding and Structural Material
⇩
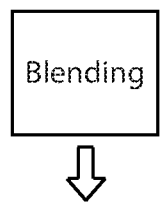
Blending ⇐ Bonding and Structural Material From Broke
⇩
Bonding and Structural Material
⇩
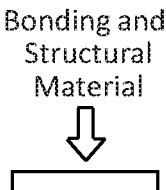
Refining
⇩
Bonding and Structural Material
⇩
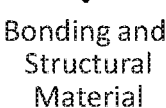
Paper Making
⇩
Paper
Figure 20

Definition of Fiber Curl

Curl (%) - Length weighted average fiber curl
  Curl = $\sum (f*l) / \sum(l)$ - Calculation is done for every fiber longer than the defined length limit (default 0.5mm).
  *(l - fiber length for single fiber)*
  *(f - fiber curl for single fiber)*

The curl for an individual fiber is defined as:

$$f = (L/l - 1) * 100 \, (\%)$$

Where $l$ is projected length and $L$ is actual length.

Critical Curl Percentage for Glue Pulp

| Measurement | Feed | Refiner 1 | Refiner 2 | Refiner 3 |
|---|---|---|---|---|
| Tensile | 30.0 | 40.1 | 43.8 | 50.3 |
| Curl(%) (0.2-0.5 mm) | 6.4 | 9.6 | 12.5 | 14.1 |
| Difference in Curl(%) to Feed | Reference | 33.3% | 48.8% | 54.6% |

Fiber Processing System

Conventional System
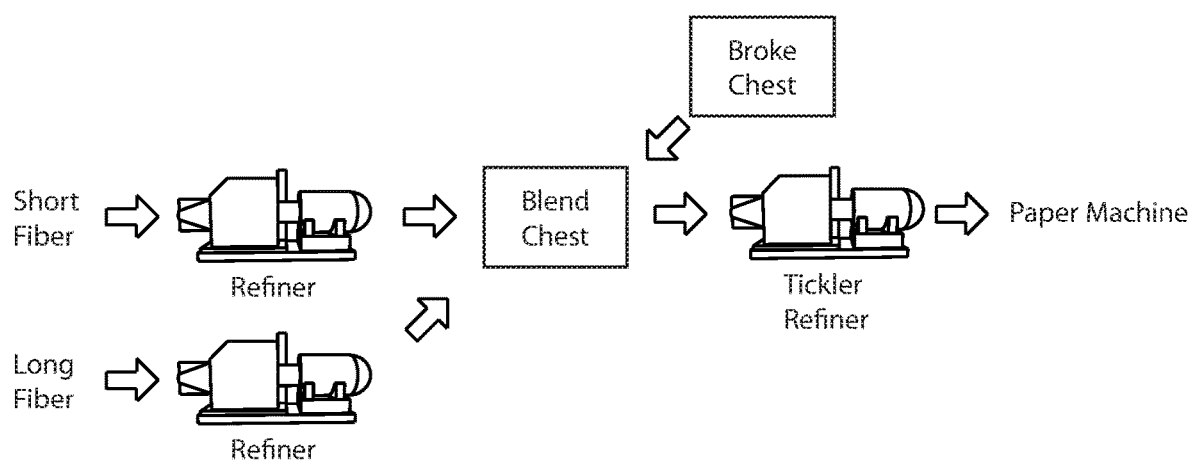
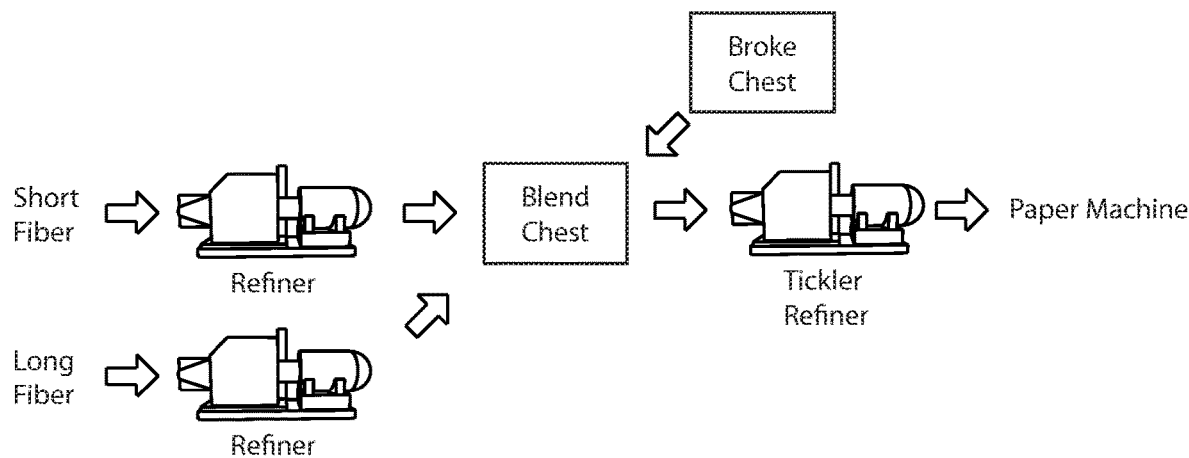
Figure 27

Central Bonding Material Generation

Static Fiber Processing Flow
Example 5

| Step 1<br>Original Fibers/ Slurry | Step 2<br>Splitting Slurry | Step 3<br>Fractionation | Step 4<br>Glue Pulp Processor | Step 5<br>Blending | Step 6<br>Optimized Fibers/ Slurry |
|---|---|---|---|---|---|
| Original Slurry<br>122<br>100% | Fractionable Portion<br>126<br>20% | Heavies Fraction 155<br>Heavy Fibers 118c<br>10%<br>Lights Fraction 153<br>Light Fibers 118b<br>10% | Refined Portion 140<br>Refined Fibers (Heavies) 118d<br>10%<br>Non-Refined Portion 138<br>Light Fibers 118b<br>10% | Refined Fibers (Heavies)<br>118d<br>10%<br>+<br>Light Fibers<br>118b<br>10%<br>+ | Optimized Slurry<br>139<br>100% |
| | Original Portion<br>128<br>80% | Original Portion<br>128<br>80% | Original Portion<br>128<br>80% | Original Fibers<br>118a<br>80% | |

Figure 32

Dynamic Fiber Processing Flow
Example 6

| Step 1 | Step 2 | Step 3 | Step 4 | Step 5 | Step 6 | Step 7 |
|---|---|---|---|---|---|---|
| Original Fibers/ Slurry | Splitting Slurry | Fractionation | Glue Pulp Processor | Glue Pulp Storage | Blending | Optimized Fibers/ Slurry |
| Original Slurry 122 100% | Fractionable Portion 126 5-30% | Heavies Fraction 155 Heavy Fibers 118c 2.5-28.5% | Refined Portion 140 Refined Fibers (Heavies) 118d 2.5-28.5% | Refined Portion 140 Refined Fibers (Heavies) 118d 2.5-28.5% | Refined Fibers (Heavies) 118d 2.5-28.5% + Light Fibers 118b .25-15% + Original Fibers 118a 70-95% | Optimized Slurry 139 100% |
| | | Lights Fraction 153 Light Fibers 118b .25-15% | Non-Refined Portion 138 Light Fibers 118b .25-15% | Non-Refined Portion 138 Light Fibers 118b .25-15% | | |
| | Original Portion 128 70-95% | Original Portion 128 70-95% | Original Portion 128 70-95% | Original Portion 128 70-95% | | |

Figure 33

Exemplary Hydrocyclone Operation Conditions

| Hydrocyclone Fractionation Conditions | Feed | Top Flow Fractionation | Bottom Flow Glue Pulp Feed | Differential |
|---|---|---|---|---|
| % Mass Balance | 100 | 31 | 69 | 2.20 |
| Flow (L/min) | 276 | 245 | 31 | 0.13 |
| % Consistency | 0.50% | 0.18% | 3.03% | 6.06 |
| Pressure (psig) | 32 | 7 | 10 | 25 |

Figure 34

Fiber Property Profile of Hydrocyclone Operation

| Fiber Properties | Feed | Top Flow Fractionation | Bottom Flow Glue Pulp Feed | % Difference Top to Bottom Flow | |
|---|---|---|---|---|---|
| Arithmetic Length (mm) | 1.50 | 1.19 | 1.71 | 30% | 12% |
| Length Weighted Length (mm) | 2.62 | 2.45 | 2.69 | 9% | 3% |
| % Fines (Optical area) | 13.6 | 24.8 | 8.3 | -199% | -64% |
| % of Fibers 0.2-0.5 (mm) | 5.9 | 11.4 | 4.0 | -185% | -48% |
| % of Fibers 0.5-1.0 (mm) | 6.8 | 7.0 | 4.0 | -75% | -70% |
| % of Fibers 1.0-1.5 (mm) | 7.5 | 7.5 | 7.5 | 0% | 0% |
| % of Fibers 1.5-2.5 (mm) | 26 | 24.4 | 27.9 | 13% | 7% |
| % of Fibers 2.5-5.0 (mm) | 53.9 | 50.7 | 53.4 | 5% | -1% |
| Avg. Fiber Wall Thickness (μm) | 2.42 | 2.33 | 2.57 | 9% | 6% |
| % Fiber Wall Thickness >3.2 μm | 35.3 | 30.3 | 39.3 | 23% | 10% |
| Cill Total (UV light scattering(LS)/IR LS) | 202.1 | - | 156.7 | - | -29% |
| Crill Attached (Washed UV LS/W. IR LS) | 145.8 | - | 132.5 | - | -10% |
| Crill Unattached (Total - Attached Crill) | 56.3 | - | 24.2 | - | -133% |

Figure 35

Profile of Fiber Properties of Glue Pulp Production

| Fiber Properties | Bottom Flow Glue Pulp Feed | Glue Pulp | % Before & After Refining |
|---|---|---|---|
| Arithmetic Length (mm) | 1.71 | 0.82 | -109% |
| Length Weighted Length (mm) | 2.69 | 1.70 | -58% |
| % Fines (weight past 200 mesh) | - | 15.4 | - |
| % Fines (Optical area) | 8.3 | 23.2 | 64% |
| Ratio of optical to weight of fines | - | 33.6% | - |
| Coarseness (weight/unit length) | 0.186 | 0.138 | -35% |
| Avg Width 0.2 - 0.5 (µm) | 24.4 | 27.9 | 13% |
| % Curl 0.2-0.5 (mm) | 6.8 | 12.5 | 46% |
| % of Fibers 0.2-0.5 (mm) | 4.0 | 20.2 | 80% |
| % of Fibers 0.5-1.0 (mm) | 4.0 | 18.5 | 78% |
| % of Fibers 1.0-1.5 (mm) | 7.5 | 10 | 25% |
| % of Fibers 1.5-2.5 (mm) | 27.9 | 24.8 | -13% |
| % of Fibers 2.5-5.0 (mm) | 53.4 | 26.4 | -102% |
| Crill Total (UV light scattering(LS)/IR LS) | 157 | 318 | 51% |

Figure 36

Paper Property Improvements

| Sample | CSF mL | Tensile lbf/In | Apparent Density g/m²*mil*0.1 | Stretch % | STFI lb/Inch | Burst psi |
|---|---|---|---|---|---|---|
| Conventional Paper Machine Sample | 740 | 24.5 | 0.51 | 2.07 | 13.0 | 49.6 |
| 10% glue pulp : 90% feed | 725 | 43.8 | 0.47 | 2.57 | 20.2 | 74.8 |
| Percent Improvement | -2.1% | 44.1% | 8.40% | 19.50% | 35.5% | 33.7% |

Figure 37

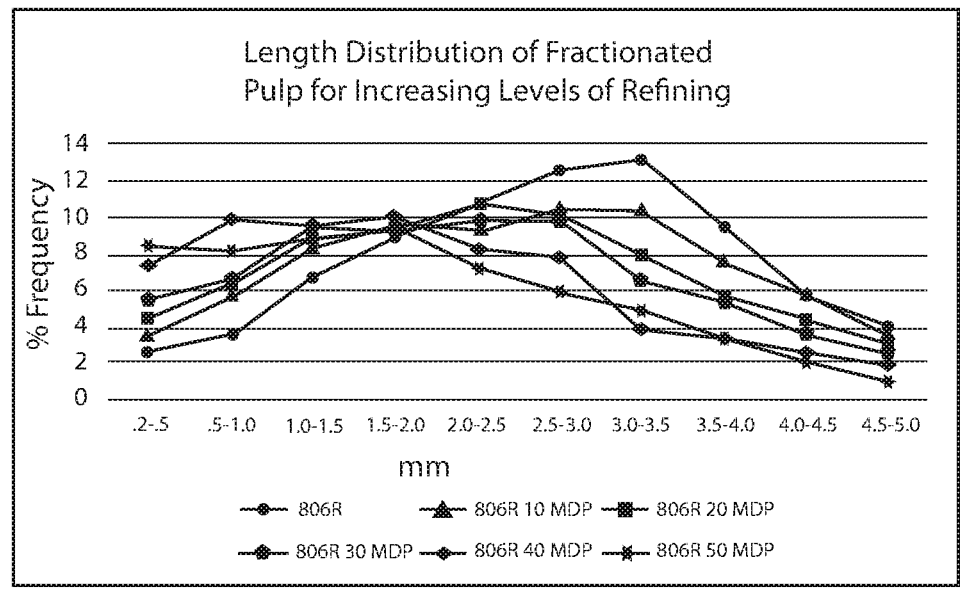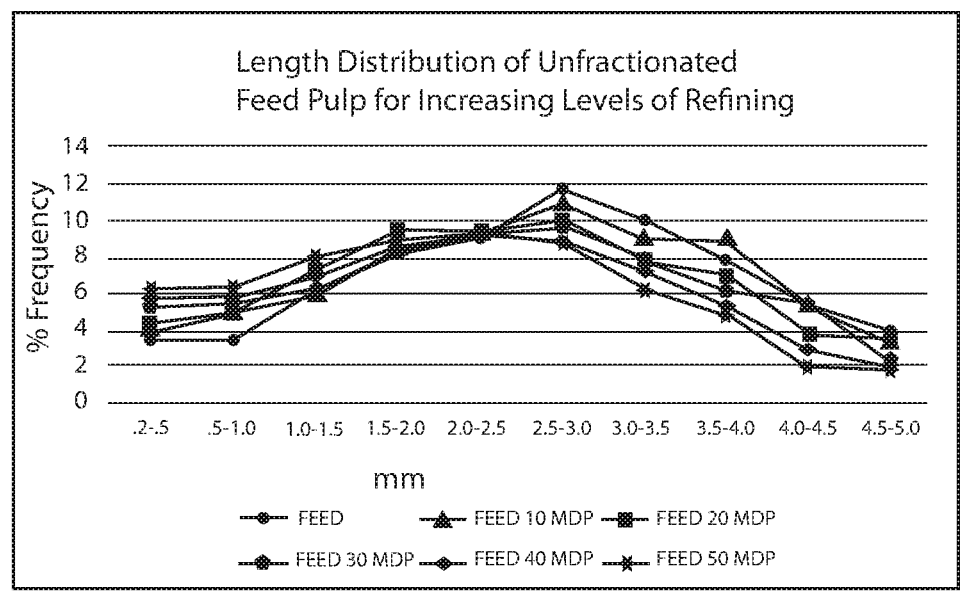
Figure 38

FRACTIONATING AND REFINING SYSTEM FOR ENGINEERING FIBERS TO IMPROVE PAPER PRODUCTION

RELATED APPLICATIONS

This application is a continuation in part of U.S. Pat. No. 10,400,394, filed on Feb. 13, 2018 and titled "Method for Engineering Fibers to Improve Paper Production", which is a division of U.S. Pat. No. 10,041,209, filed on Aug. 20, 2016 and titled "System for Engineering Fibers to Improve Paper Production", which claims the benefit of priority of U.S. Provisional Patent Application No. 62/208,355, filed Aug. 21, 2015, all of which are herein incorporated by reference.

FIELD

The present invention generally relates to a system for making paper from cellulosic fibers. More specifically, it relates to a system that engineers the cellulosic fibers to improve paper quality and reduce paper production costs.

BACKGROUND

Paper, board and tissue are made from pulp that includes cellulosic fibers originally processed from wood chips. These chips are processed mechanically or chemically to liberate the fibers from the fiber/lignin structure. Liberated fibers are usually bleached and refined as a single slurry before being formed and dried on a paper machine to make reels of paper. Softwood and hardwood fibers are usually processed separately until final blending just before paper machine processing.

Cellulosic fibers are a natural biological material derived from trees. As a biological material there is great diversity in fiber quality within one tree, let alone regionally and among different species. Current state of the art paper fabrication systems generally assume this diversity is a constant when transforming fibers into paper with the exception of distinguishing between softwood and hardwood fibers. In order to accommodate this assumption, large operating safety margins are built into the paper making process. The assumption that all incoming fiber quality is constant limits the potential benefit of specific fibers in the overall distribution and also limits the flexibility of optimization within the overall process. For example, if one tries to improve sheet strength through refining then water removal will be adversely affected and vice versa. The ability to change paper properties independent of paper machine operation variables is restricted by the assumption that pulp is made up of fibers with constant quality.

The present invention aims to provide a new system for treating cellulosic fibers that improves upon the currently unresolved issues described above by allowing one to select out defined fiber distributions that can be independently processed and recombined to make a superior paper product at lower costs.

SUMMARY

In one implementation, the present disclosure is directed to a system for measuring properties of fluid suspended cellulosic fibers. The system is comprised of a fractionator, a fractionator monitoring device and a vibration analyzer. The fractionator monitoring device includes a vibration sensor. The vibration sensor measures the vibration spectrum of the fractionator. The vibration analyzer determines vibration characteristics of the fractionator spectrum and compares the vibration characteristics to an acceptable characteristic; if the fractionator vibration characteristic is outside of a characteristic limit an alert signal is generated.

In another implementation, the present disclosure is directed to a system for engineering fiber properties suspended in a fluid. The system comprises a fiber fractionation system inlet that splits fibers from feed pulp into an original portion containing original fibers and a fractionable portion containing original fibers. The original portion and the fractionable portion have substantially the same composition. The system also comprises a fractionator to fractionate the original fibers of the fractionable portion into a heavies fraction having heavies fibers and a lights fraction having lights fibers. The system further comprises a refiner to refine the heavies fraction into refined heavies. An amount of refined heavies is blended back with the original portion to create a recombined slurry for making a paper product.

In another implementation, the present disclosure is directed to a system for engineering fiber properties of fluid suspended fibers, the fibers pass through primary, secondary, and/or tertiary fractionators to generate fractionated fiber slurries. Each fractionator has an incoming fractionable portion and produces a heavies fraction and a lights fraction. The system is comprised of an incoming fiber measurement device and a heavies fiber measurement device. The incoming fiber measurement device is interfaced to measure incoming fiber properties of the fractionable portion. The heavies fiber measurement device is interfaced to measure outgoing heavies fiber properties of a combination of the heavies fractions from the plurality of fractionators. Incoming fractionable fiber properties are compared to the combination of outgoing heavies fiber properties and a process parameter is adjusted to generate a targeted fiber property.

In another implementation, the present disclosure is directed to a system for engineering fiber properties of fluid suspended cellulosic fibers. The system is comprised of a plurality of fractionators that generate fractionated fiber slurries, each fractionator receiving an incoming fractionable portion with incoming fiber properties and incoming pressure and each fractionator producing a heavies fraction and a lights fraction. The heavies fraction having outgoing heavies fiber properties and an outgoing heavies pressure, flow and consistency. The lights fraction having outgoing lights fiber properties and an outgoing lights pressure, flow and consistency. The system also includes an incoming fiber measurement device interfaced to measure the incoming fiber properties of a combination of the incoming fractionable fiber portions. The system further includes a heavies fiber measurement device interfaced to measure outgoing heavies fiber properties of a combination of the heavies fractions from the plurality of fractionators. The incoming fiber properties are compared to the outgoing heavies fiber properties and the heavies pressure, flow or consistency is adjusted relative to the incoming pressure, flow or consistency to optimize the outgoing heavies fiber properties.

In another implementation, the present disclosure is directed to a system for engineering cellulosic fibers suspended in a fluid. The system comprises a fiber fractionation system inlet that splits incoming cellulosic fibers into an original portion and a fractionable portion. The original portion and the fractionable portion have substantially the same composition. The system also comprises a fractionator to fractionate the original fibers of the fractionable portion into a heavies fraction having heavies fibers and a lights fraction having lights fibers. The system further comprises a refiner feed chest that is fed by a heavies fiber storage, and a refiner receiving heavies fibers from the refiner feed chest. The heavies fibers are processed through the refiner to create refined fibers and recirculated back into the refiner feed chest until optical refined properties and crill bonding area targets are achieved to create glue pulp. The system also comprises a fiber measurement system interfaced to measure cellulosic fiber properties of the original fibers, refined fibers and additionally at least one fiber property from the group consisting of the lights fraction and heavies fraction. The system still further comprises glue pulp storage tank to store glue pulp from the refiner feed chest. The system measures cellulosic fiber properties that are used to determine an amount of glue pulp to be re-combined with original portion to construct a recombined slurry for making a paper product.

In another implementation, the present disclosure is directed to a system for engineering cellulosic fibers suspended in a fluid. The system comprises a fiber fractionation system inlet that splits incoming cellulosic fibers into an original portion and a fractionable portion. The original portion and the fractionable portion have substantially the same composition. The system further comprises a fractionator to fractionate the original fibers of the fractionable portion into a heavies fraction having heavies fibers and lights fraction having lights fibers. The system has a plurality of refiners in series receiving heavies fibers from a heavies refiner feed chest. The heavies fibers are processed through the refiners to create refined fibers that have a specific refined fiber property to create glue pulp. A fiber measurement system is interfaced to measure cellulosic fiber properties of the original fibers, refined fibers and additionally at least one fiber property from the group consisting of the lights fraction and the heavies fraction. A glue pulp storage tank stores glue pulp from the plurality of refiners. The system measures cellulosic fiber properties to determine an amount of glue pulp to be re-combined with the original portion to construct a recombined slurry for making a paper product.

In still another implementation, the present disclosure is directed to a system for engineering cellulosic fibers suspended in a fluid that has been split into an original portion and a refinable portion. The system is comprised of a refiner to refine the refinable portion into a refined portion. The system further comprises a fiber property measurement system interfaced to measure cellulosic fiber properties of the cellulosic fibers. Measured cellulosic fiber properties are then used to determine an amount of said refined portion to be re-combined with the original portion to construct a recombined slurry that will produce an optimized paper product.

In still another implementation, the present disclosure is directed to a method for optimizing paper machine operation. The method comprises first providing original pulp, glue pulp comprised of refined heavies fractionate from the original pulp and a blender. The method then involves blending the original pulp and the glue pulp to create a pulp mixture in the blender. The method further involves adjusting the percentage of glue pulp mixture to optimize the paper properties and paper machine operation while maintaining a targeted amount of blended pulp mixture.

In still yet another implementation, the present disclosure is directed to a method for optimizing paper machine operation and paper properties. The method comprises first providing original pulp. The method then involves splitting the original pulp into a fractionable portion and an original portion that are substantially the same composition. The method then involves fractionating the fractionable portion into a heavies fraction having heavies fibers and a light fraction having light fibers. The method then involves refining the heavies fibers to produce glue pulp. The method finally involves blending the original portion and an amount of glue pulp to create a recombined slurry.

In still yet another implementation, the present disclosure is directed to a method for preparing cellulosic fibers within a paper mill. The method comprises first providing feed pulp and a plurality of individual paper machines. The method then involves splitting the original pulp into a structural portion and a portion to be turned into glue pulp. The method further involves processing the portion to be turned into glue pulp into glue pulp through a single refining step to create a single source of glue pulp. The method further involves supplying a portion of the glue pulp from the single source of glue pulp to the individual paper machines. Finally the method involves combining the glue pulp with the original structural portion prior to processing through each individual paper machine to make a paper product. All bonding material for all paper machines in the mill comes from the single source of glue pulp.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 12 is an exemplary process flow diagram for one embodiment of processing cellulosic fibers in conjunction with the system of FIG. 1;

FIG. 13 is an exemplary process flow diagram for another embodiment of processing cellulosic fibers in conjunction with the system of FIG. 1;

FIG. 15 is an exemplary process flow diagram for one embodiment of processing cellulosic fibers in conjunction with the system of FIG. 14;

FIG. 16 is an exemplary process flow diagram for another embodiment of processing cellulosic fibers in conjunction with the system of FIG. 14;

FIG. 17 is a table indicating processing for several samples using the system shown in FIGS. 1 and 14 as compared to standard conventional processing;

FIG. 20 is a block diagram for the process flow associated with the conventional system of FIG. 19;

FIG. 27 is a schematic diagram showing conventional processing within a paper mill;

FIG. 32 is an exemplary process flow diagram for one embodiment of processing cellulosic fibers through the system of FIG. 21;

FIG. 33 is an exemplary process flow diagram for one embodiment of processing cellulosic fibers through the system of FIG. 21;

FIG. 34 is an example of hydrocyclone processing operation conditions when making paper using the system of FIG. 21;

FIG. 35 is an example of fiber property profiles when making paper using the system of FIG. 21;

FIG. 36 is an example of fiber properties of glue pulp production when making paper using the system of FIG. 21;

FIG. 37 is an example of paper property improvements when making paper using the system of FIG. 21;

FIG. 38 are examples of length distribution of fractionated and unfractionated feed pulp showing improvements that may be obtained using the system of FIG. 21.

DETAILED DESCRIPTION

The present invention embraces the biological variability of cellulosic fibers 118 (a.k.a. fiber) found in wood and provides a system 120 that uses this fiber variability to improve paper production and allow for new paper products to be produced with improved quality and reduced production costs. The way in which system 120 accomplishes this is by separating cellulosic fibers 118, then preferentially refining these separated fibers to a higher level of development than can now be achieved with the common practice where the full pulp flow is refined, and then blending back preferentially refined pulp to accommodate for fiber quality variations in the original pulp. Instead of adjusting refining, which is the current state of the art; paper makers will adjust blending to balance production output with respect to the type of paper and quality of paper. The resulting pulp mixture can be used to produce paper with various desired improved characteristics and reduced process costs.

Figure 1:
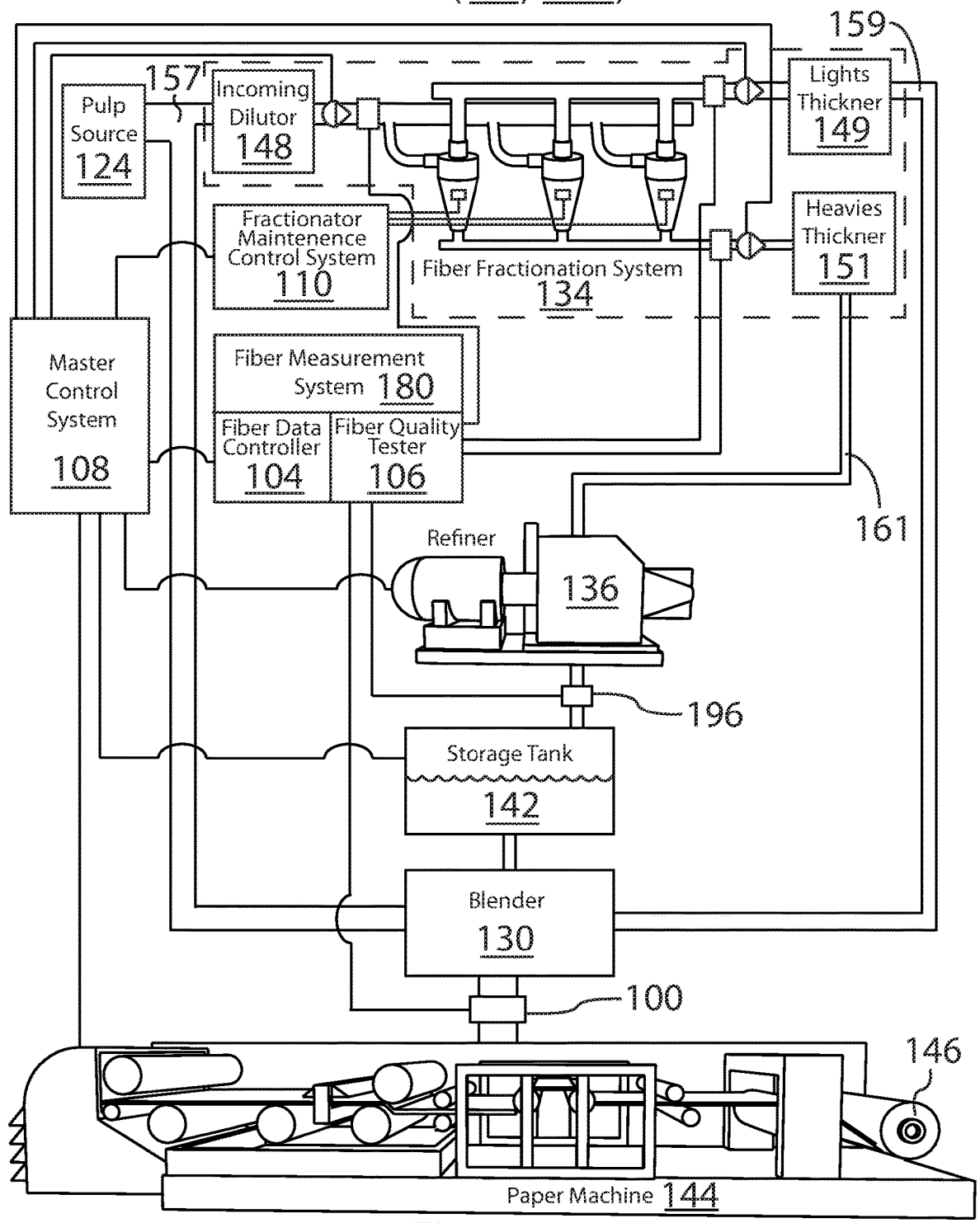
FIG. 1 is a schematic diagram of one exemplary deployment of the system for engineering fibers to improve paper production.

System 120 for engineering fibers to improve paper quality is illustrated in FIGS. 1-39. Cellulosic fibers 118 created from wood are generally suspended in a fluid such as water during processing. Suspended fibers along with the suspension fluid are generally known as a slurry. The slurry may also include additives such as defoamers, bonding agents, sizing agents, retention agents, drainage agents, fillers, enzymes, etc. System 120 (120a and 120b), FIGS. 1 and 114 comprises incoming fibers (a.k.a. original fibers 118a) as original slurry 122 obtained from a pulp source 124. In one embodiment, FIG. 20a, original slurry 122 (a.k.a. feed or feed pulp) is then split between a fractionable portion 126 and the remaining original portion 128. Remaining original portion 128 is directed to blender 130. Fractionable portion 126 is then processed by fiber fractionation system 134. Here fibers 118 are separated by a given fiber property/characteristic, such as fiber wall thickness, fiber density, fiber size, etc. One fraction, unrefined portion 138, is sent to blender 130 while the other portion to be refined is sent to refiner 136 where fibers 118 are refined to create a refined portion 140. Refined fibers 118d are held in storage tank 142. Varying amounts of refined portion 140, non-refined portion 138 and original portion 128 are then blended together in blender 130 to produce optimized slurry 139 with optimal characteristics to be processed by paper machine 144 and create an optimized paper product 146. For example, the cellulosic fibers may have the same or increased bonding area with better drainage or the optimized cellulosic product may have increased strength while maintaining bulk, caliper and stiffness. Although the word "paper" is used as a modifier throughout this disclosure as in "paper machine" and also as an example of an end product that can be fabricated with system 120, it should be understood that the use of the word "paper" is meant to also include board, tissue and all other sheeted products made from cellulosic wood fibers Fiber fractionation system 134 (a.k.a fractionator) may be any type of system that can separate cellulosic fibers 118 based on a fiber property. Fiber properties may include fiber wall thickness, fiber density, fiber size (length, width), fiber shape, amount of crill/nanofibrils (total, attached, unattached), fines content, etc. In one embodiment fiber fractionation system 134a is a bank of hydrocyclones 150 connected in parallel, FIG. 2a. In another embodiment fiber fractionation system 134b may include hydrocyclones 150 in series to create primary, secondary, and/or tertiary banks in series, FIG. 2b. In FIG. 2b arrows indicate direction of flow. Fractionators may also be screens, differential belt washers, flotation devices, etc. Hydrocyclones 150 each separate cellulosic fibers 118 based on at least one from the group including fiber wall thickness and fiber size. Connecting multiple hydrocyclones 150 in parallel allows for greater throughputs as each hydrocyclone can only process a limited flow rate.

Figure 2A:
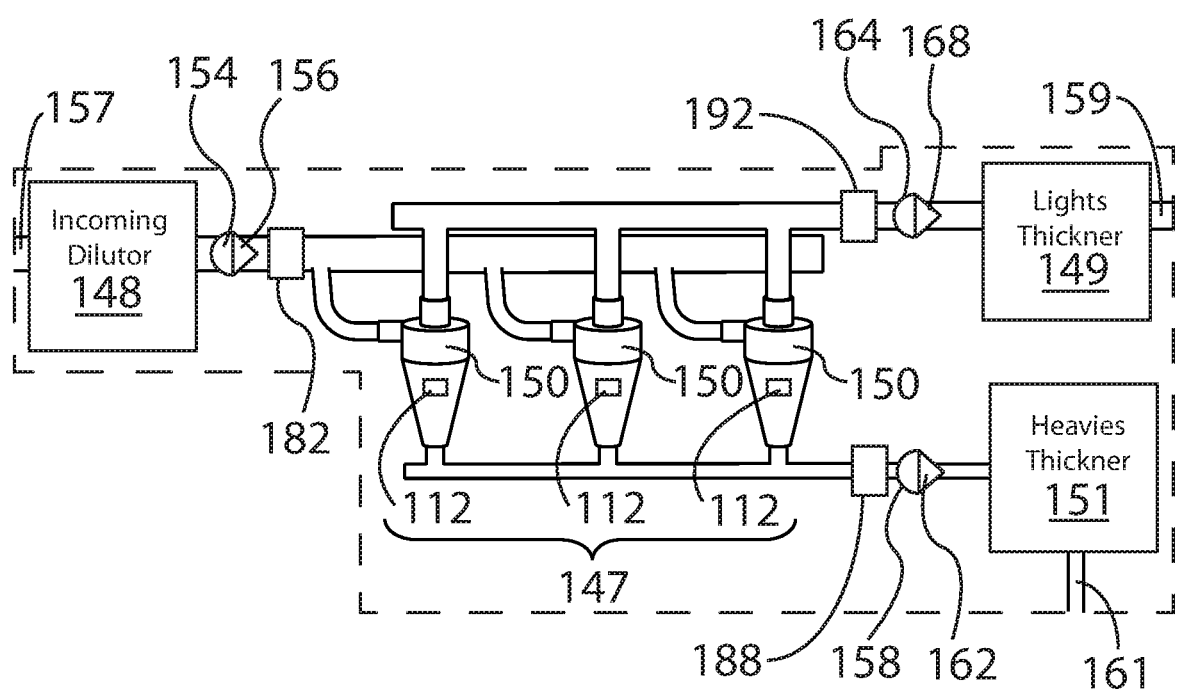
FIG. 2a is a schematic diagram of one embodiment of the fiber fractionation system shown in FIG. 1.
Figure 2B:
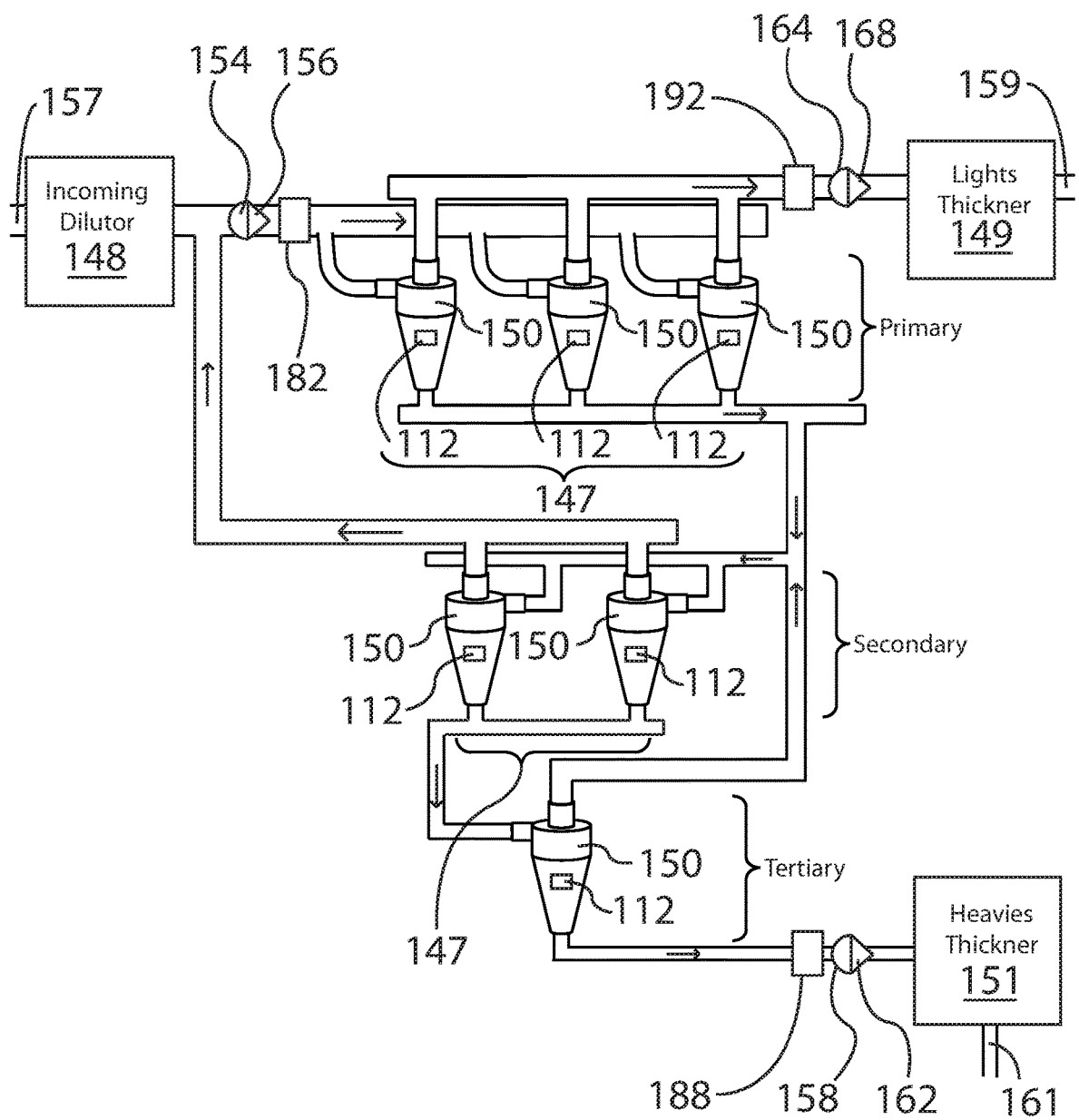
FIG. 2b is a schematic diagram of an alternative embodiment of the fiber fractionation system shown in FIG. 2a, now having primary, secondary and tertiary fractionators.

Fiber fractionation system 134 (134a and 134b), FIGS. 2a and 2b, may have additional components that aid in the process of fractionation. For example, an incoming diluter 148 may be used to adjust the fluid content of the fractionable portion 126 of the slurry before it enters hydrocyclone bank 147. A lights thickener 149 may be used to adjust the fluid content of the lights fraction 153 exiting fiber fractionation system 134. A heavies thickener 151 may be used to adjust the fluid content of the heavies fraction 155 exiting fiber fractionation system 134. Additionally pressure meters, mass flow meters, and consistency meters may be integrated to measure pressure, flow and consistency of the slurry as it enters the fiber fractionation system at fiber fractionation system inlet 157 and exits as one or more of the fractionated portions 153 and/or 155 at either lights outlet 159 or heavies outlet 161. Consistency is defined as the percent solids content in a slurry. Incoming pressure meter 154 measures incoming pressure of fractionable portion 126 to all fractionators. Incoming flow meter 156 measures a combination of incoming flow rates of fractionable portion 126 flowing into all fractionators. Heavies pressure meter 158, if present, measures outgoing heavies pressure of the heavies fraction 155. Heavies flow meter 162, if present, measures a combination of outgoing flowing rates of the heavies fraction 155 flowing from all fractionators. Incoming consistency is measured by fiber measurement system 180 as a combination of incoming consistency of fractionable portion 126 flowing into all fractions. Lights pressure meter 164 measures outgoing lights pressure of the lights fraction 153. Lights flow meter 168 measures a combination of outgoing flow rates of the lights fraction 153 flowing from all fractionators. Lights consistency is measured as outgoing lights consistency of lights fraction 153. Incoming pressure and consistency, outgoing heavies pressure and outgoing lights pressure can be adjusted relative to each other to regulate flow rates and the degree of fractionation desired.

Figure 3:
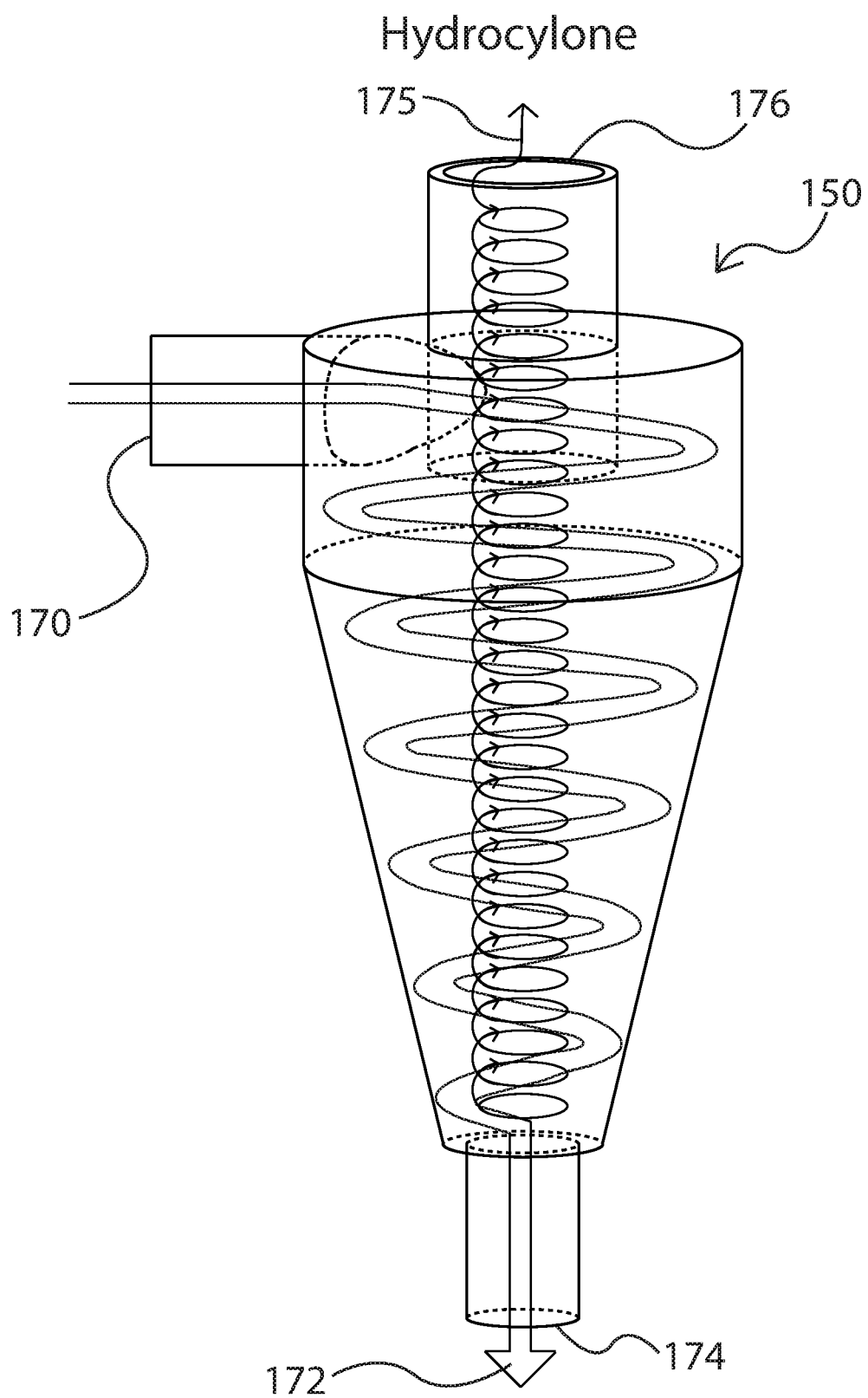
FIG. 3 is a schematic view diagraming the internal working of a hydrocyclone fractionator used in the system of FIGS. 2a and 2b.

Each hydrocyclone 150 works as shown in FIG. 3. Incoming slurry is fed under pressure through fractionator inlet 170. Fractionator inlet 170 is offset to one side of hydrocyclone 150. The slurry spins in a downward spiral towards the outer walls of hydrocyclone 150 as depicted by heavies flow arrow 172. Thicker, heavy fibers 118c drift outwards towards the walls of hydrocyclone 150 and exit through the bottom heavies fractionator outlet 174. Lighter fibers 118b and fines drift towards the center of hydrocyclone 150 and spin centrally upwards as depicted by lights flow arrow 175. Fines are defined as fiber components that can pass through a 200-mesh Bauer McNett screen. These lighter fibers 118b and fines spiral upward exiting through the top lights fractionator outlet 176.

In one embodiment fiber fractionation system 134 operates as follows. Each fractionator receives incoming fractionable portion with incoming fibers properties, incoming pressure, and incoming consistency. The fractionators then generates fractionated fibers slurries. Each fractionator produces a heavies fraction and a lights fraction. The heavies fraction has outgoing fiber properties, outgoing pressure and outgoing consistency. The lights fraction has outgoing lights fiber properties, outgoing lights pressure and outgoing lights consistency. An incoming fiber measurement device is interfaced to measure the incoming fiber properties of a combination of said incoming fractionable fiber portions. A heavies fiber measurement device may be interfaced to measure outgoing heavies fiber properties of a combination of the heavies fractions from the plurality of fractionators. The incoming fiber properties are compared to the outgoing heavies fiber properties and for example the heavies pressure is adjusted relative to the incoming pressure to optimize the outgoing heavies fiber properties and to control fractionation efficiency.

Figure 4A:
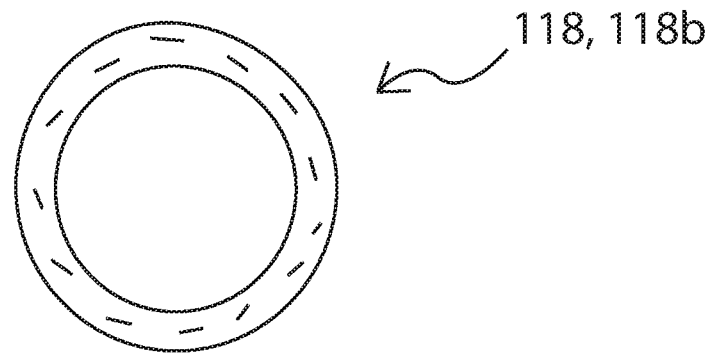
FIG. 4a is a schematic, sectional view of a thin walled cellulosic fiber before treatment by the system of FIG. 1.
Figure 4B:
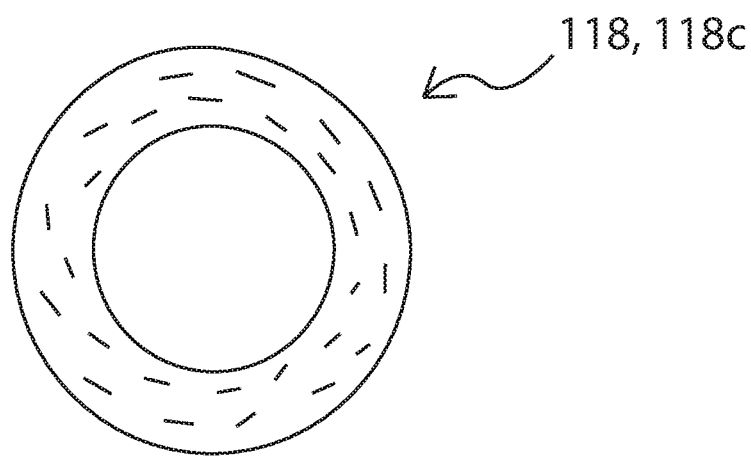
FIG. 4b is a schematic, sectional view of a thick walled cellulosic fiber before treatment by the system of FIG. 1.
Figure 5A:
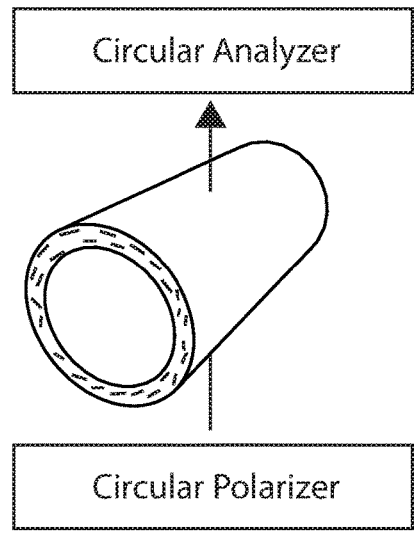
FIG. 5a is a diagram illustrating one technique for measuring fiber wall thickness of fibers processed by the system of FIG. 1.
Figure 5B:
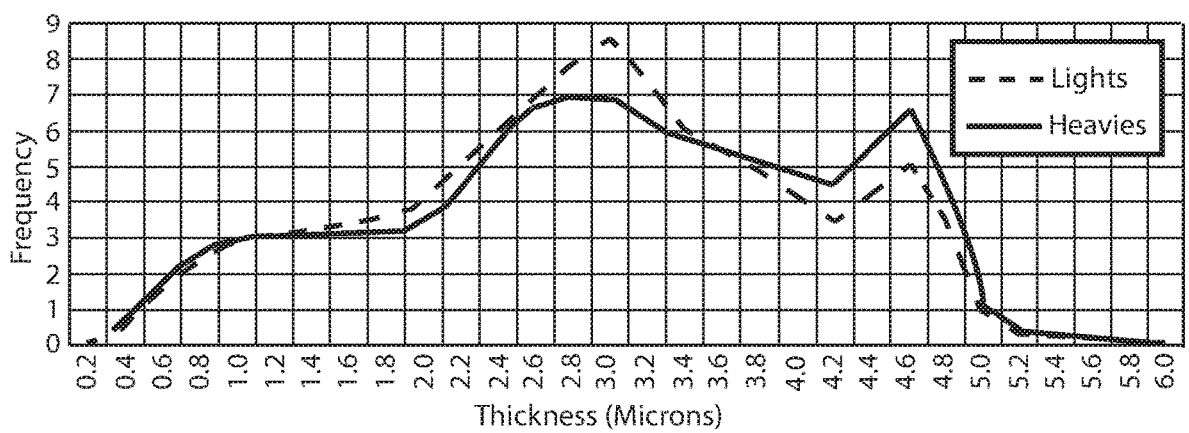
FIG. 5b is a graph of exemplary fiber wall thickness distribution for pulp after processing through the fiber fractionation system of the system of FIG. 1.

FIGS. 4a and 4b depict cross-sections of a thin walled, light fiber 118b (a.k.a. lights) and a thick walled, heavy fiber 118c (a.k.a. heavies). The thicker the wall of fiber 118, the more weight the fiber has and the more likely to exit the bottom heavies fractionator outlet 174. The thinner the wall of fiber 118, the less weight the fiber has and the more likely to exit top lights fractionator outlet 176. Fiber wall thickness may be measured by red green blue (RGB) circular polarized light as shown in FIG. 5a and taught in U.S. Pat. No. 7,289,210, which is herein incorporated by reference. FIG. 5b shows exemplary data where fiber wall thickness has shifted after fractionation.

Figure 6A:
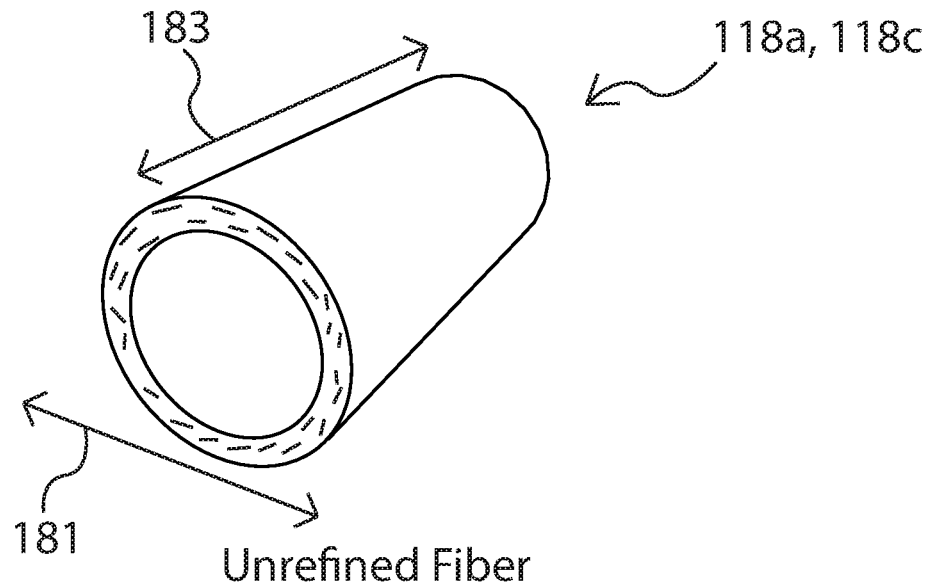
FIG. 6a is a schematic, perspective view of an unrefined fiber before treatment by the system of FIG. 1.
Figure 6B:
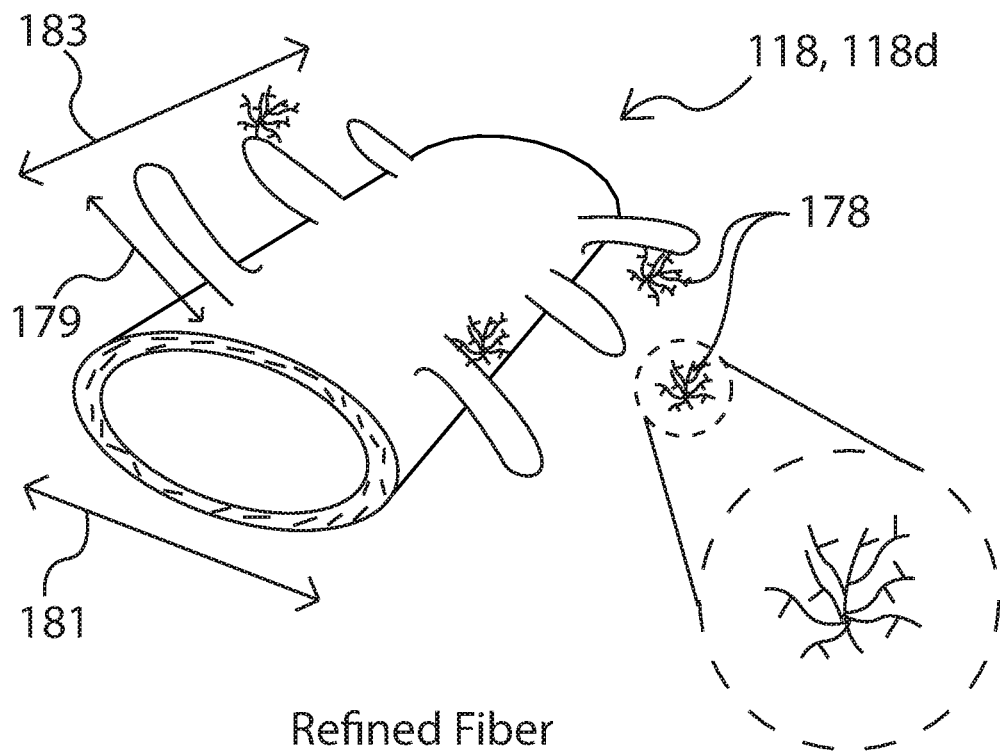
FIG. 6b is a schematic, perspective view of the cellulosic fiber of FIG. 6a, after one possible treatment step to the fiber is completed as part of the system of FIG. 1.
Figures 7A, 7B:
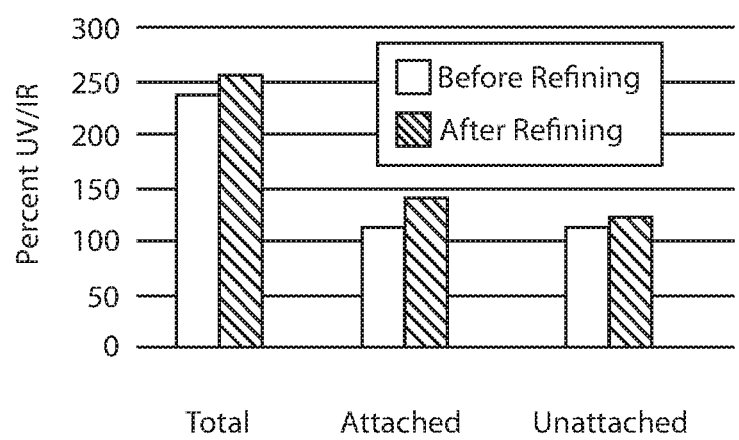
FIG. 7a is a diagram illustrating one technique for measuring fiber crill for fibers processed by the system of FIG. 1.
FIG. 7b is a graph of exemplary crill properties for pulp before and after processing through the refiner of the system of FIG. 1.

Refinement of fibers 118 can be used to modify fiber elements contained within the slurry. Refining is the development of a fiber to generate more surface area through mechanical, chemical or biological processing. FIGS. 6a and 6b schematically show the fiber elements of crill/nanofibrils 178, macrofibrils 179, fiber width 181 and fiber length 183 before and after refinement. Generally these cellulosic elements are sized as follows: crill/nanofibrils 178 (having lengths of 0.1-1 micron), macrofibrils 179 (having lengths of 1-20 microns), fiber widths 181 (20-microns to 1-millimeter) and fiber lengths 183 (1-5 millimeters). Other engineering or refinement of fibers 118 may include deflaking, deshiving or fiberizing. A fiber property such as the amount of crill 178 (total, attached and unattached) determines the bonding surface area of fiber 118 and directly relates to the strength of the paper. A larger percentage of crill 178, both attached and unattached also affects the speed of drying of paper, board and tissue and can affect the amount of energy and time required to make the paper, board and tissue and adversely affecting paper production costs. A thick walled or heavy unrefined original fiber 118a in cross-section is depicted in FIG. 6a. After refinement through refiner 136, the refined fiber 118d in cross-section will be deformed and have more crill 178 (total, attached and unattached) as shown in FIG. 6b. Crill (total, attached and unattached) is cellulosic material in the nanofibril size range and is measured by the ratio of UV light absorption to IR light absorption as shown in FIG. 7a and taught in U.S. Pat. No. 4,514,257, which is herein incorporated by reference. Light is projected through the cellulose fiber components and scatter is recorded. Crill is calculated by the relationship between the scatter generated by UV versus IR light, where UV light scatters the nanofibrils (crill). FIG. 7b shows representative crill bonding area data before and after refining.

Figure 8:
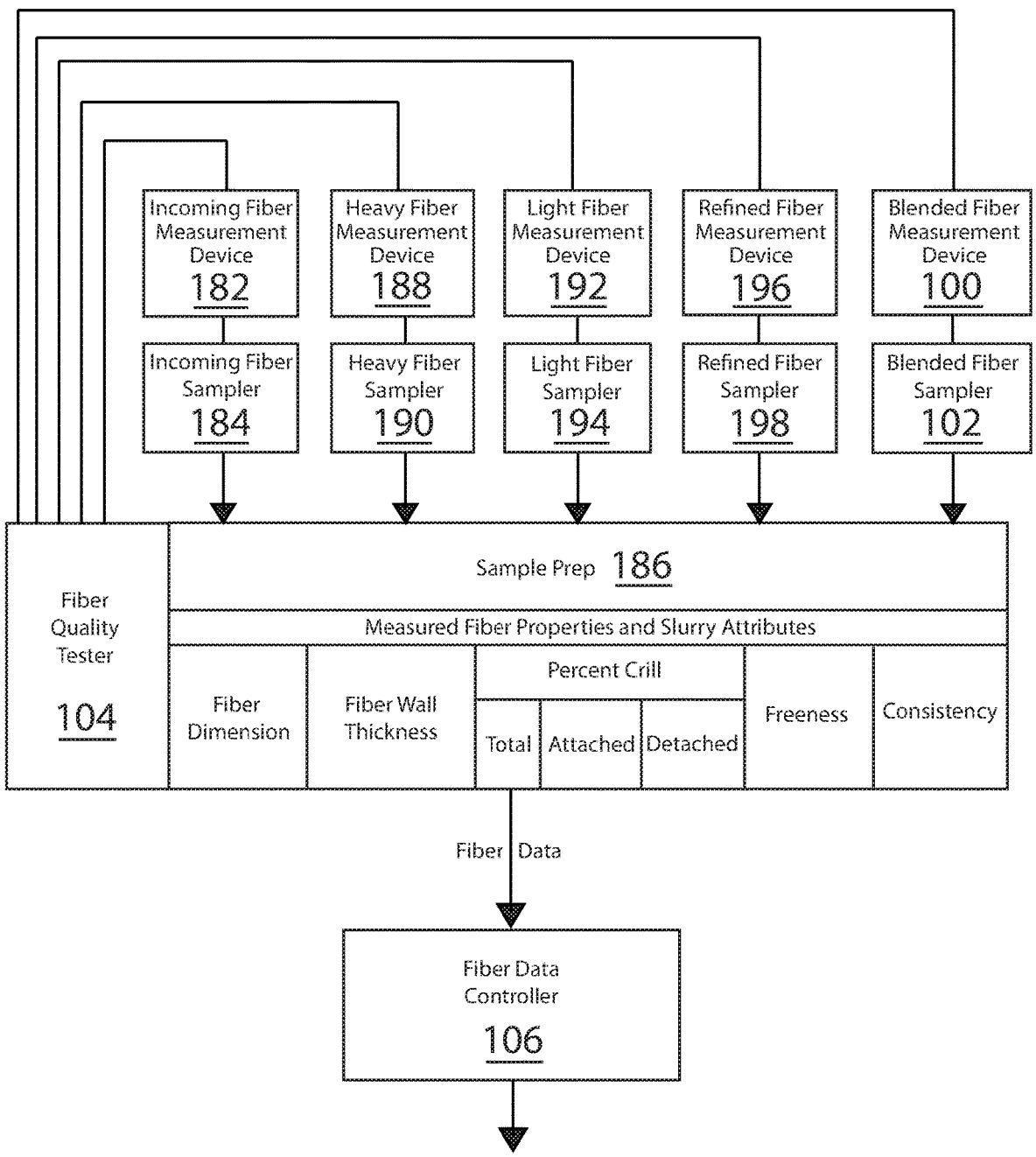
FIG. 8 is a schematic diagram of the fiber measurement system of the system shown in FIG. 1.

Fiber measurement system 180, FIG. 8, includes one or more fiber measurement devices. Although many fiber measurement devices are shown with fiber quality tester 104 testing many properties of the fiber, it should be understood that only a select few of the fiber measurement devices and properties may actually be implemented in any system 120 depending on what the final paper product to be manufactured requires. Fiber measurement system 180 may include incoming fiber measurement device 182. Incoming fiber measurement device 182 is interfaced to measure incoming fiber properties of the fractionable portion 126 and includes an incoming sampler 184. Fiber sampled from incoming fiber sampler 184 is directed to sample prep 186. Fiber measurement system 180 may include heavy fiber measurement device 188. Heavy fiber measurement device 188 is interfaced to measure outgoing heavies fiber properties of a combination of the heavies fractions from a plurality of fractionators and includes a heavy fiber sampler 190. Fiber sampled from heavy fiber sampler 190 is directed to sample prep 186. Fiber measurement system 180 may include light fiber measurement device 192. Light fiber measurement device 192 includes a light fiber sampler 194. Fiber sampled from light fiber sampler 194 is directed to sample prep 186. Fiber measurement system 180 may include refined fiber measurement device 196. Refined fiber measurement device 196 includes a refined fiber sampler 198. Fiber sampled from refined fiber sampler 198 is directed to sample prep 186. Fiber measurement system 180 may include blended fiber measurement device 196. Blended fiber measurement device 100 includes a blended fiber sampler 102. Fiber sampled from blended fiber sampler 102 is directed to sample prep 186. Individual fiber samples prepared by sample prep 186 are then each tested for one or more fiber properties or slurry attributes such as fiber dimensions (length and width), fines content, fiber wall thickness, percent crill (total, attached, detached), freeness, consistency, pH, etc. Sample prep 186 and the tests that follow for each fiber property make up the fiber quality tester 104. A fiber data controller 106 is integrated with fiber quality tester 106 to send appropriate fiber data to master control system 108.

In one embodiment fiber measurement system 180 is used to compare incoming fractionable fiber properties to a combination of outgoing heavies properties and then use this result to adjust process parameters to achieve a targeted fiber property. In another embodiment fiber measurement system 180 is used to compare incoming fractionable fiber properties to a combination of outgoing lights properties and then use this result to adjust process parameters to achieve a targeted fiber property.

Figure 9:
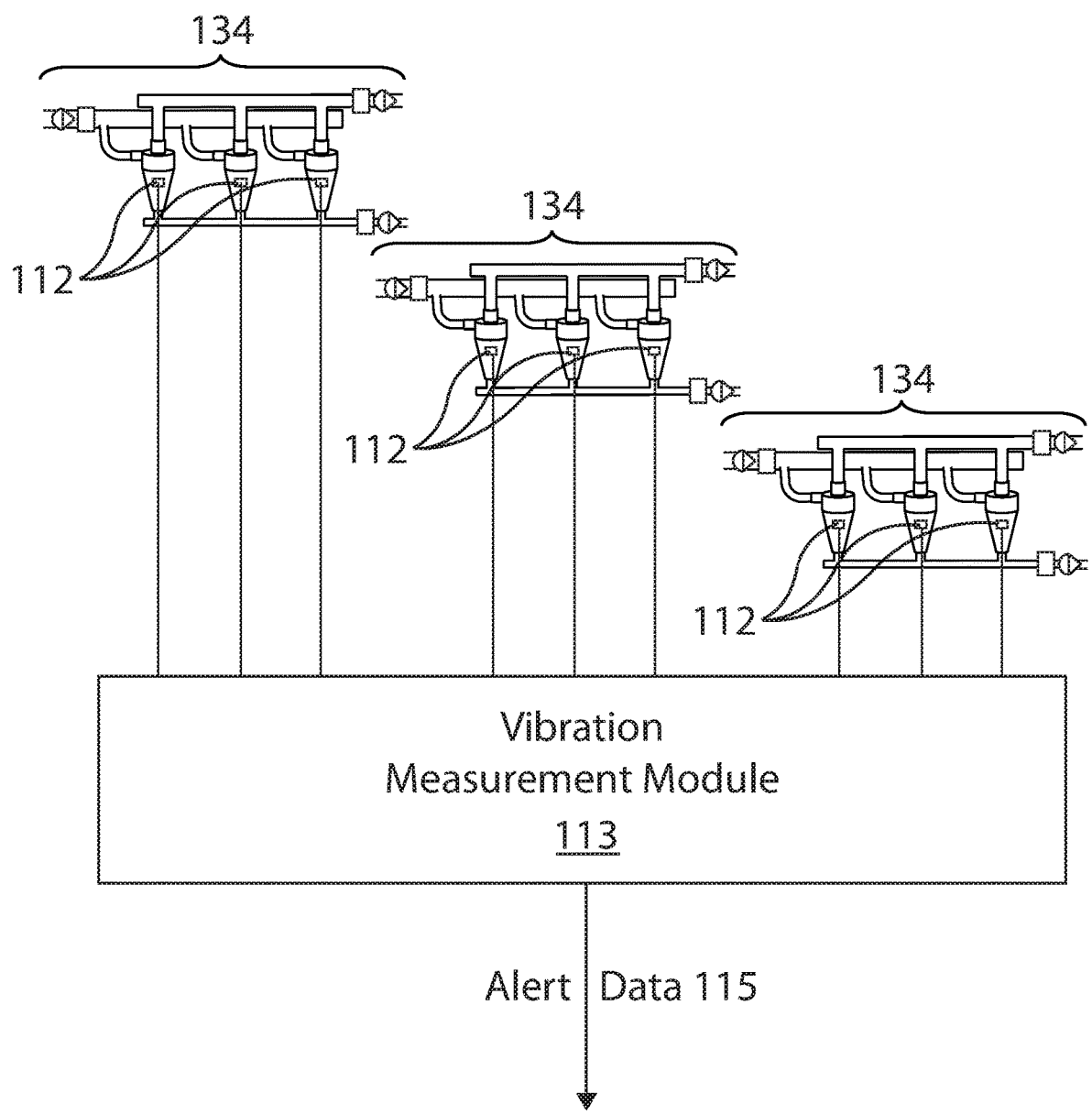
FIG. 9 is a schematic diagram of the fractionation maintenance system of the system shown in FIG. 1.
Figure 10:
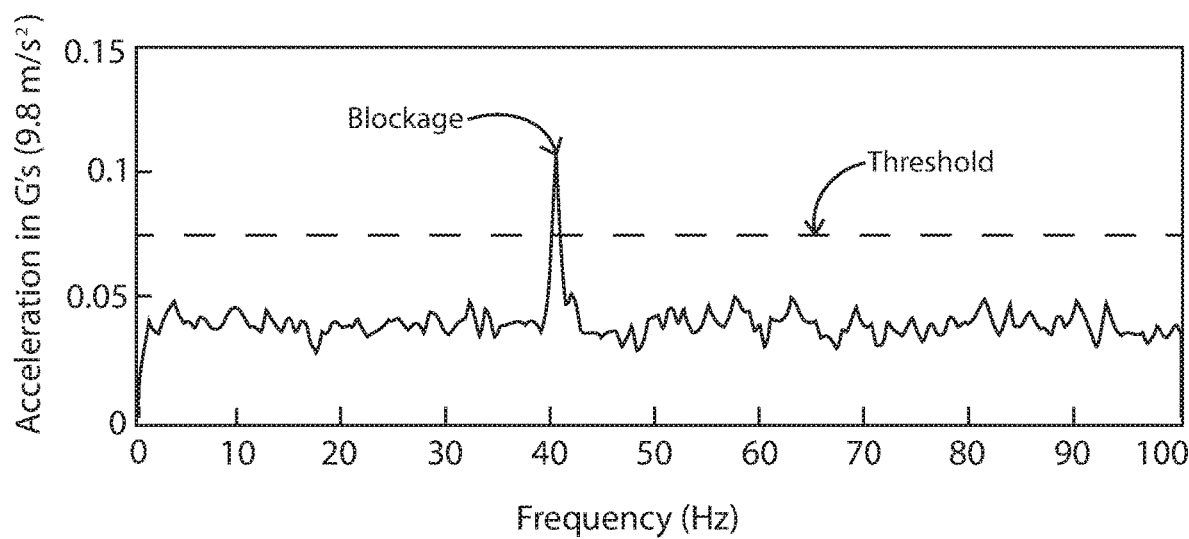
FIG. 10 is a plot of vibration spectra and a specific vibration characteristic that may be measured from the vibration sensor shown in FIG. 9.
Figure 11:
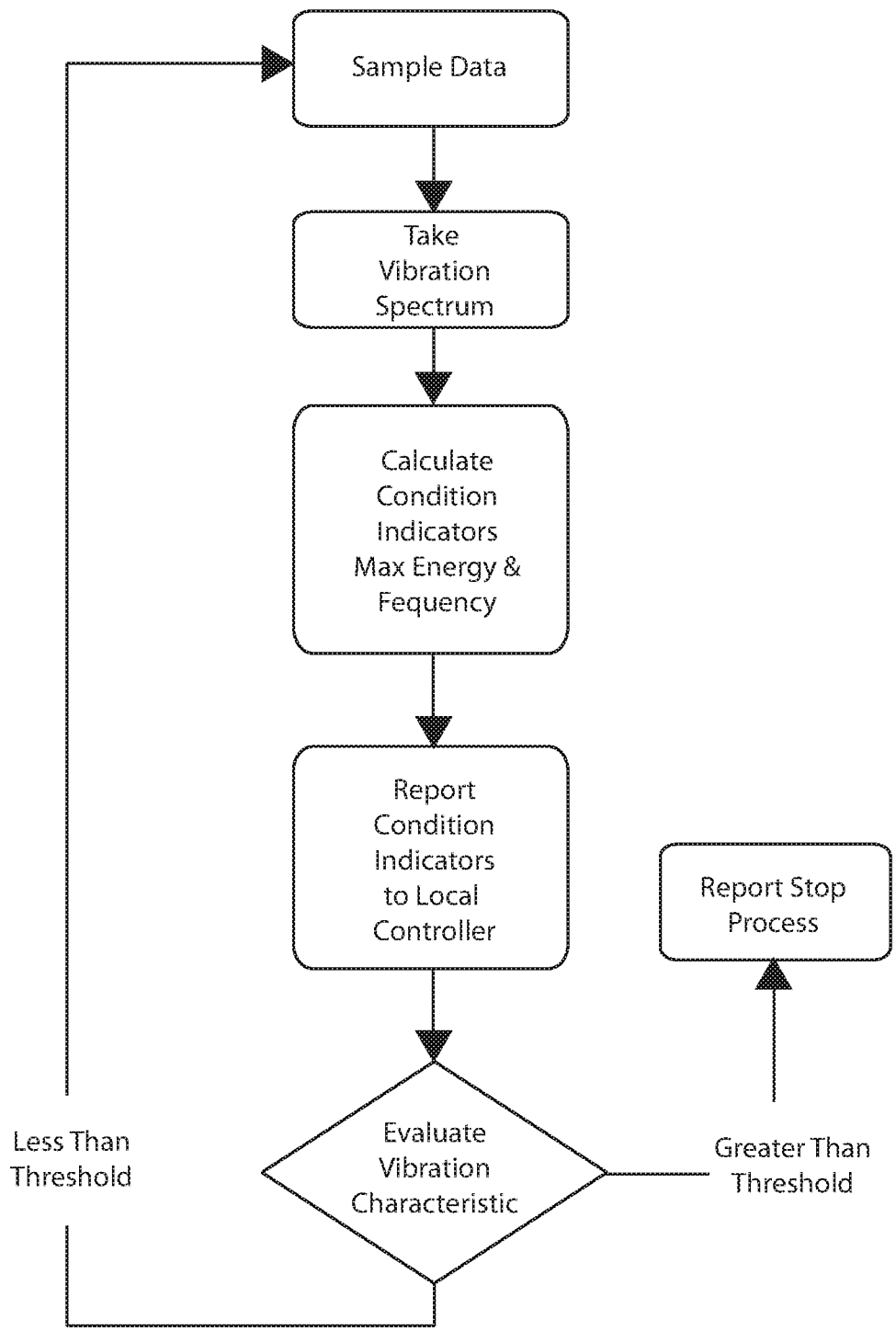
FIG. 11 is a flowchart of how the vibration spectra and vibration characteristic shown in FIG. 10 may be used to produce an alert in conjunction with the fractionation maintenance system of FIG. 9.

System 120 may include a fraction maintenance system 110, FIG. 9. Fraction maintenance system 110 includes a fractionator monitoring device 112 interfaced with one or more fractionators to monitor operation of the fractionator. When fractionating by weight of fibers the fractionator is preferably a hydrocyclone 150. Fractionator monitoring device 112 includes a vibration sensor. The vibration sensor measures the vibration spectrum of the fractionator. One example of a vibration spectra showing a vibration characteristic indicating a blockage within a hydrocyclone is shown in FIG. 10. A vibration analyzer, FIG. 11, determines vibration characteristics of the fractionator vibration spectrum and compares the vibration characteristics to an acceptable characteristic in vibration measurement module 113. If the fractionator vibration characteristics are outside of a characteristic limit (a.k.a. threshold) an alert is signaled. Alert data 116 is transmitted to master control system 108.

Fiber data controller 104 receives fiber data and uses that data for overall control of system 120 through master control system 108. Master control system 108 adjusts incoming pressure, incoming consistency, outgoing heavies pressure and outgoing lights pressure to regulate flow rates and the degree of fractionation desired. Master control system 108 also regulates refiner 136 to refine heavies fraction 155 to the appropriate level of refining. Master control system 108 further regulates the amount of refined fiber stored in storage tank 142. Master control system 108 also regulates how original unrefined fiber 118a, refined fiber 118d and possibly additionally fractionated unrefined fiber is blended in blender 130 to produce an optimized slurry with optimal characteristics to be processed by paper machine 144 to create an optimized paper, board or tissue products 146. Master control system 108 also receives fractionator alert data 115 and sends out alerts to keep fiber fractionator system 134 in optimal working condition.

In one embodiment (Example 1), system 120, 120a, is used in a static mode where the amount of fiber flowing through each portion of the system is a constant predetermined amount. FIG. 12 illustrates step-by-step processing for such an embodiment showing the amount of fiber flow in each portion of system 120. When operating in this mode, previous experimental data is used to predetermine what the fiber flow will be through each portion of system 120. In step 1—100-percent of original fibers 118a suspended in a fluid enters the system as original slurry. Step 2—the slurry is split. 150-percent goes to fiber fractionation system 134 as fractionable portion 126 and the other 50-percent (original portion 128) is redirected to blender 130. Step 3—fractionation occurs. The fractionable portion 126 is introduced into the fractionators and is separated/fractionated by the fractionators into 15-percent heavy fibers 118c (heavies fraction 155) and 35-percent light fibers 118b (lights fraction 153). The 35-percent lights fraction is directed to blender 130. Step 4—refining fibers to maximize bonding area, the 15-percent of heavies fibers is directed to and processed by refiner 136. Step 5—blending the three fiber types: original fibers 118a, light fibers 118b and refined heavy fibers 118d are recombined and blended together. Step 6—the optimized slurry is achieved and sent to paper machine 144 to be turned into an optimized paper, board or tissue product 146. Percentages stated above are only for this one illustrative example; however these percentages should not be considered limiting and other percentages may be used.

In one embodiment (Example 2) system 120 is used in a dynamic mode where the amount of fiber flowing through each portion of the system is adjusted as measurements come in and are analyzed by master control system 108. FIG. 13 illustrates step-by-step processing for such an embodiment showing ranges for the amount of fiber flow in each portion of system 120 at any given time. In step 1—100-percent of original fibers 118a suspended in a fluid enters the system as original slurry. Step 2—the slurry is split within the given ranges depending on what type of paper is to be manufactured and feedback information gathered in the rest of the process flow. For example, fiber in the range of 45-55 percent goes to fiber fractionation system 134 as fractionable portion 126 and the other 45-55 percent (original portion 128) is redirected to blender 130. Step 3—fractionation occurs. The fractionable portion 126 is introduced into the fractionators and is separated/fractionated into 13.5-16.5 percent heavy fibers 118c (heavies fraction 155) and 33.5-36.5 percent light fibers 118b (lights fraction 153). The 33.5-36.5 percent lights fraction is directed to blender 130. Step 4—refining, the 13.5-16.5 percent of heavies is directed to and processed by refiner 136. Step 5—capacitance involves storing the fiber and then drawing upon the stored fibers as needed to mix the ideal fiber composition. Step 6—blending the three fiber types: original fibers 118a, light fibers 118b and refined heavy fibers 118d are recombined and blended together in any percentage that is required to produce the optimized slurry. Step 7—the optimized slurry is achieved and sent to paper machine 144 to be turned into an optimized paper, board or tissue product 146. Percentages stated above are only for this one illustrative example; however these percentages should not be considered limiting and other percentages may be used.

Figure 14:
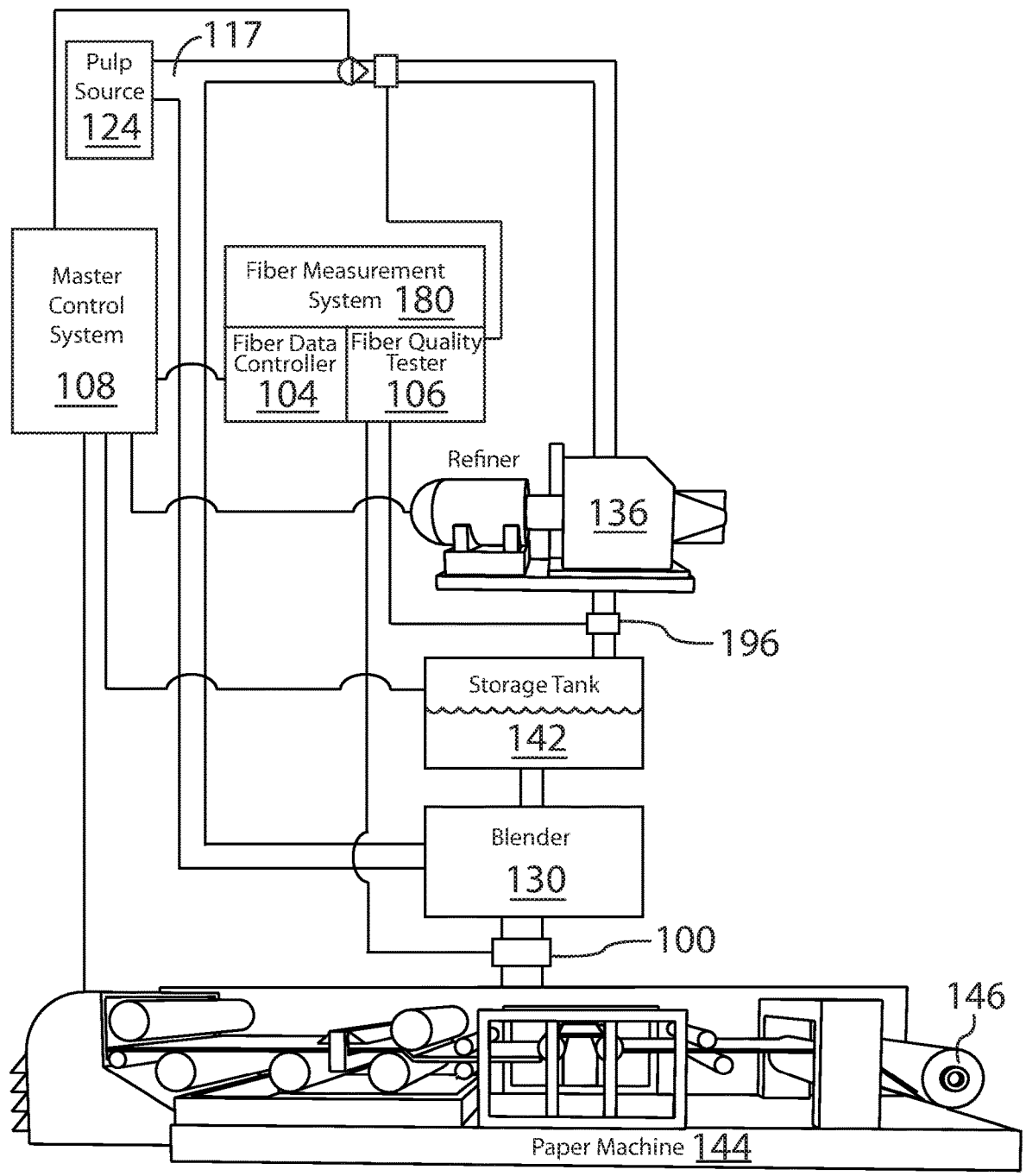
FIG. 14 is a schematic diagram of another exemplary deployment of the system for engineering fibers to improve paper production.

In an alternative embodiment, FIG. 14, system 120, 120a has been modified to remove fiber fractionation system 134 and fractionator maintenance control system 110 giving a modified system as shown in system 120, 120b. In system 120b, cellulosic fibers 118 are split into a refinable portion 160 and the remaining original portion 128 at feed splitter 117. Remaining original portion 128 is directed to blender 130. Fibers 118 from refinable portion 160 are then refined into refine portion 140. Refined fibers 118d are held in storage tank 142. Varying amounts of refined portion 140 and original portion 128 are then blended together in blender 130 to produce optimized slurry 139 with optimal characteristics to be processed by paper machine 144 and create an optimized paper product 146.

In one embodiment (Example 3), system 120, 120b is used in a static mode where the amount of fiber flowing through each portion of the system is a constant predetermined amount. FIG. 15 illustrates step-by-step processing for such an embodiment showing the amount of fiber flow in each portion of system 120. When operating in this mode, previous experimental data is used to predetermine what the fiber flow will be through each portion of system 120. In step 1—100-percent of original fibers 118a suspended in a fluid enters the system as original slurry. Step 2—the slurry is split. 15-percent goes to refiner 136 as refinable portion 160 and the other 85-percent (original portion 128) is redirected to blender 130. Step 3—refining fibers to maximize bonding area, the 15-percent of refinable fibers is directed to and processed by refiner 136. Step 4—blending the two fiber types: original fibers 118a and refined fibers 118d are recombined and blended together. Step 5—the optimized slurry is achieved and sent to paper machine 144 to be turned into an optimized paper, board or tissue product 146. Percentages stated above are only for this one illustrative example; however these percentages should not be considered limiting and other percentages may be used.

In one embodiment (Example 4), system 120, 120b is used in a dynamic mode where the amount of fiber flowing through each portion of the system is adjusted as measurements come in and are analyzed by master control system 108. FIG. 16 illustrates step-by-step processing for such an embodiment showing ranges for the amount of fiber flow in each portion of system 120 at any given time. In step 1—100-percent of original fibers 118a suspended in a fluid enters the system as original slurry. Step 2—the slurry is split within the given ranges depending on what type of paper is to be manufactured and feedback information gathered in the rest of the process flow. For example, fiber in the range of 10-20 percent goes to refiner 136 as a refinable portion 160 and the other 80-90 percent (original portion) is redirected to blender 130. Step 3—refining, the 10-20 percent of refinable portion is directed to and processed by refiner 136. Step 4—capacitance involves storing the fiber and then drawing upon the stored fibers as needed to mix the ideal fiber composition. Step 5—blending the two fiber types: original fibers 118a and refined fibers 118d are recombined and blended together in any percentage that is required to produce the optimized slurry. Step 6—the optimized slurry containing optimized fibers is achieved and sent to paper machine 144 to be turned into an optimized paper, board or tissue product 146. Percentages stated above are only for this one illustrative example; however these percentages should not be considered limiting and other percentages may be used.

FIG. 17 (Table 1) lists data for samples prepared in accordance with system 120 (120a, 120b) discussed in this disclosure and also for comparison samples that were prepared using standard conventional processing. Variables included whether fractionation occurred, the amount of feed and refined fibers combined, and the amount of refining the fibers were exposed to. For samples that were fractionated, a portion of feed slurry was fractionated at 0.5% TAPPI Standard T240 consistency. TAPPI® is a registered trademark of Technical Association of the Pulp and Paper Industry, Inc. Fractionated heavies were refined in a TAPPI standard T248 PFI mill at varying revolutions. Fractionated and refined heavies were blended back with feed slurry at varying percentages. TAPPI Standard T227 CSF drainage testing was performed on each blended slurry. TAPPI Standard T205 handsheets at 80 g/m$^2$ were generated. TAPPI Standard T822 Ring Crush Strength Testing was performed. For samples that were not fractionated (unfractionated), a portion of feed slurry was refined in a TAPPI standard T248 PFI mill at varying revolutions. Refined feed slurry was then blended back with unrefined feed slurry at 25%. TAPPI Standard T227 CSF drainage testing was performed on each blended slurry. TAPPI Standard T205 handsheets at 80 g/m2 were generated TAPPI Standard T822 Ring Crush Strength Testing was performed. For standard conventional processing, all feed slurry was refined in a TAPPI standard T248 PFI mill at varying revolutions. TAPPI Standard T227 CSF drainage testing was performed on each level of refining. TAPPI Standard T205 handsheets at 80 g/m2 were generated from sample from each level of refining. TAPPI Standard T822 Ring Crush Strength Testing was performed on all handsheets.

Figure 18:
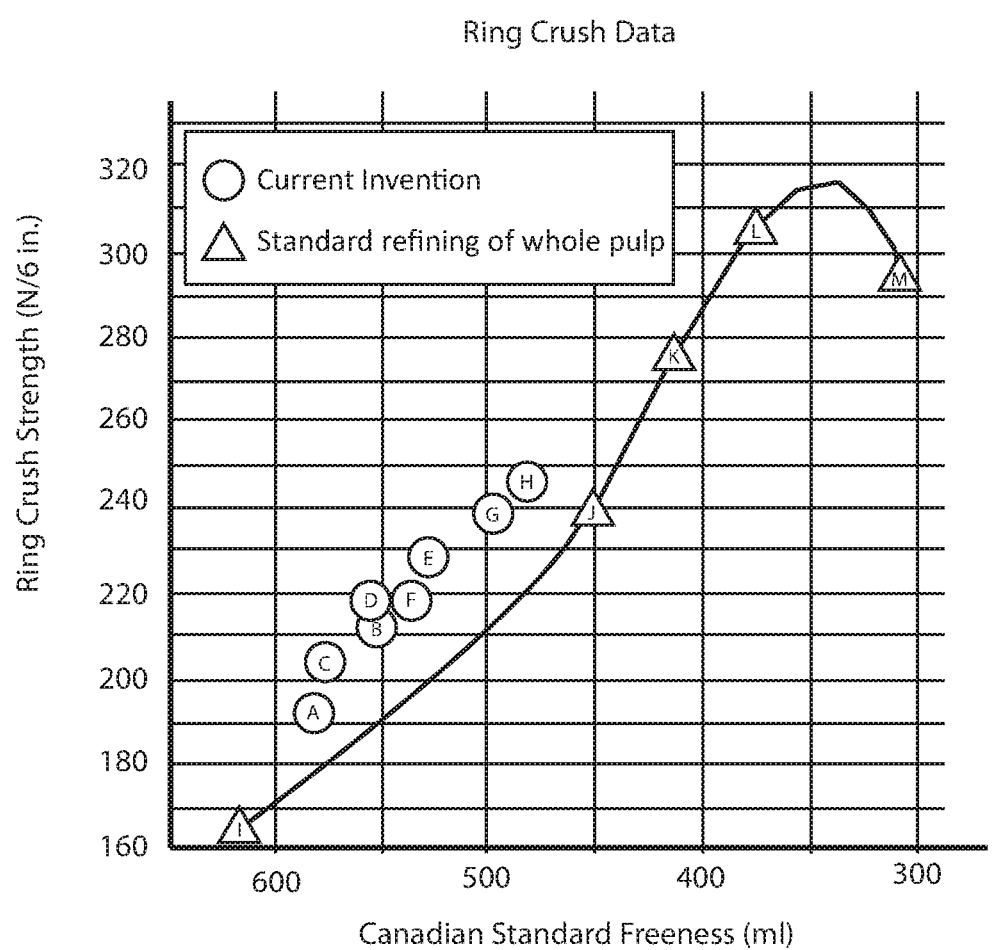
FIG. 18 is a plot of sample data from FIG. 17 comparing strength of paper prepared with the present invention against paper prepared with standard whole pulp refinement.

FIG. 18 shows a plot of the exemplary data for paper strength of the samples of FIG. 17 using standard refining practices and those practices outlined in this disclosure by the current invention associated with system (120, 120a, 120b). Triangular data points on the line are strength numbers of handsheets made from pulp using standard conventional refining practices. Circular data points are handsheet strength numbers made from pulp where highly refined fibers were blended with feed pulp at different blend percentages and refining levels. Paper strength was significantly increased using the system and method proposed by the current invention. TAPPI Standard T220 "beater curves", plotting strength of increasingly beaten pulp with freeness, were used to quantify the paper and board making strength potential for a given pulp sample. The comparison to be observed in FIG. 18 is the strength of new engineered paper according to the present invention with the TAPPI standard process. Obtaining higher strength at higher drainage levels is desirable as the easier it is for water removal at target strength, the greater the productivity (by increased production levels and with lower fiber usage). FIG. 18 shows refining heavies such that once blended back with original portion there is a step change of 5-15 percent higher ring crush strength at a target freeness (proxy for paper machine drainage) than when all fibers are refined. Refining has diminishing returns where increasing bonding levels are compromised by the break down in fiber structure. For the currently engineered fibers is it critical that only a portion of the fiber is refined. In this way it is possible to maximize bonding levels on that portion without compromising water removal or fiber structure. This is achieved in two ways, either by refining a portion of fractionated heavies or by refining a portion of the feed pulp. To get results A to H, which represents an average of 10% increase in strength at the same drainage as standard results, it is critical to blend either refined feed or refined fractionated heavies with feed pulp. These results cannot be achieved by conventionally refining of all feed pulp.

The slurry required to make paper includes bonding material and structural material. Bonding material is the additional surface area created during the generation of new cellulosic elements when preparing pulp fibers for making paper products on a paper machine. Surface area is related to the amount of crill and optical fines. Structural material is the cellulosic elements most closely resembling the original unrefined feed pulp fibers. The structural material maintains the drainage characteristics and paper structure characteristics. Drainage is commonly measured by Canadian Standard Freeness. Paper structural characteristics include bulk, stiffness, caliper and opacity properties.

Figure 19:
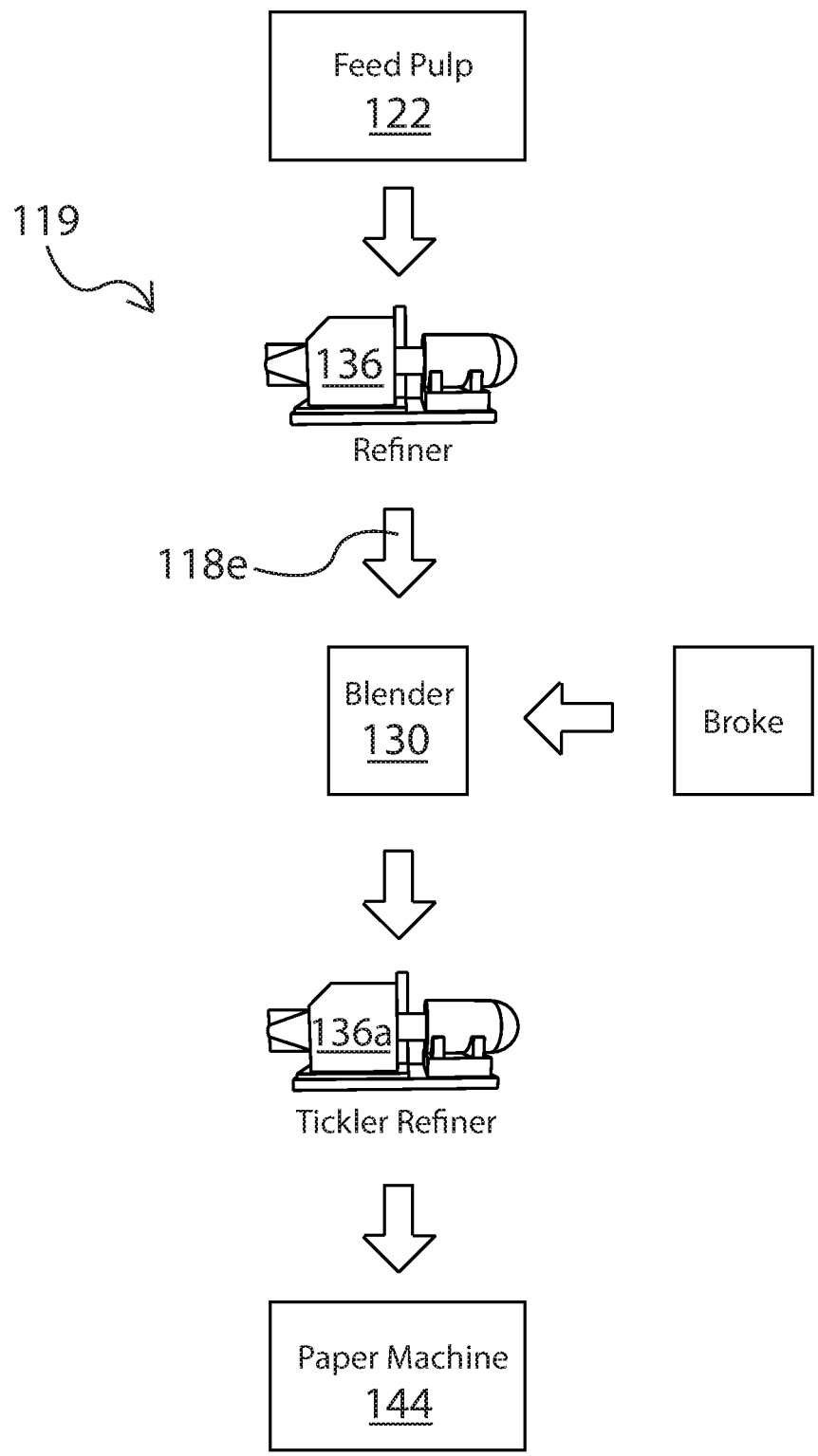
FIG. 19 is a schematic diagram of a conventional system used in paper production.

A typical conventional system 119 for making paper, FIG. 19, processes structural material and bonding material together at the same time. Feed pulp 122 is directed into a refiner 136. Refiner 136 refines feed pulp 122 to create conventionally refined cellulosic fibers 118$e$ with a targeted level of refining. Conventionally refined fibers 118$e$ are then directed to a blender 130 where they are blended with broke. Tickler refiner 136$a$ is where final bonding material can be generated, and the only location where added broke is also refined. Structural material and bonding material exit the tickler refiner 136$a$ and are directed to paper machine 144 where they are used to create a conventional paper product.

The process flow for the conventional system 119, FIG. 20, shows slurry for bonding material and structural material entering the system together as feed pulp. The process involves refining the bonding and structural material together. The process then involves blending the refined bonding and structural material with broke. The process may include tickler refining after blending. The purpose of tickler refining is the final adjustment of bonding material. Paper making then occurs by using the bonding and structural material to make paper.

There are several limitations associated with conventional processing. In conventional processes there is always a compromise between making the most effective bonding material and maintaining sufficient structural material. This compromise is a result of refining all pulp fibers together, which is exacerbated by multiple refining processes. Further limitations come from operator judgment being applied to refining. The operator judgment is required to continually reassess the refining compromises.

Figure 21:
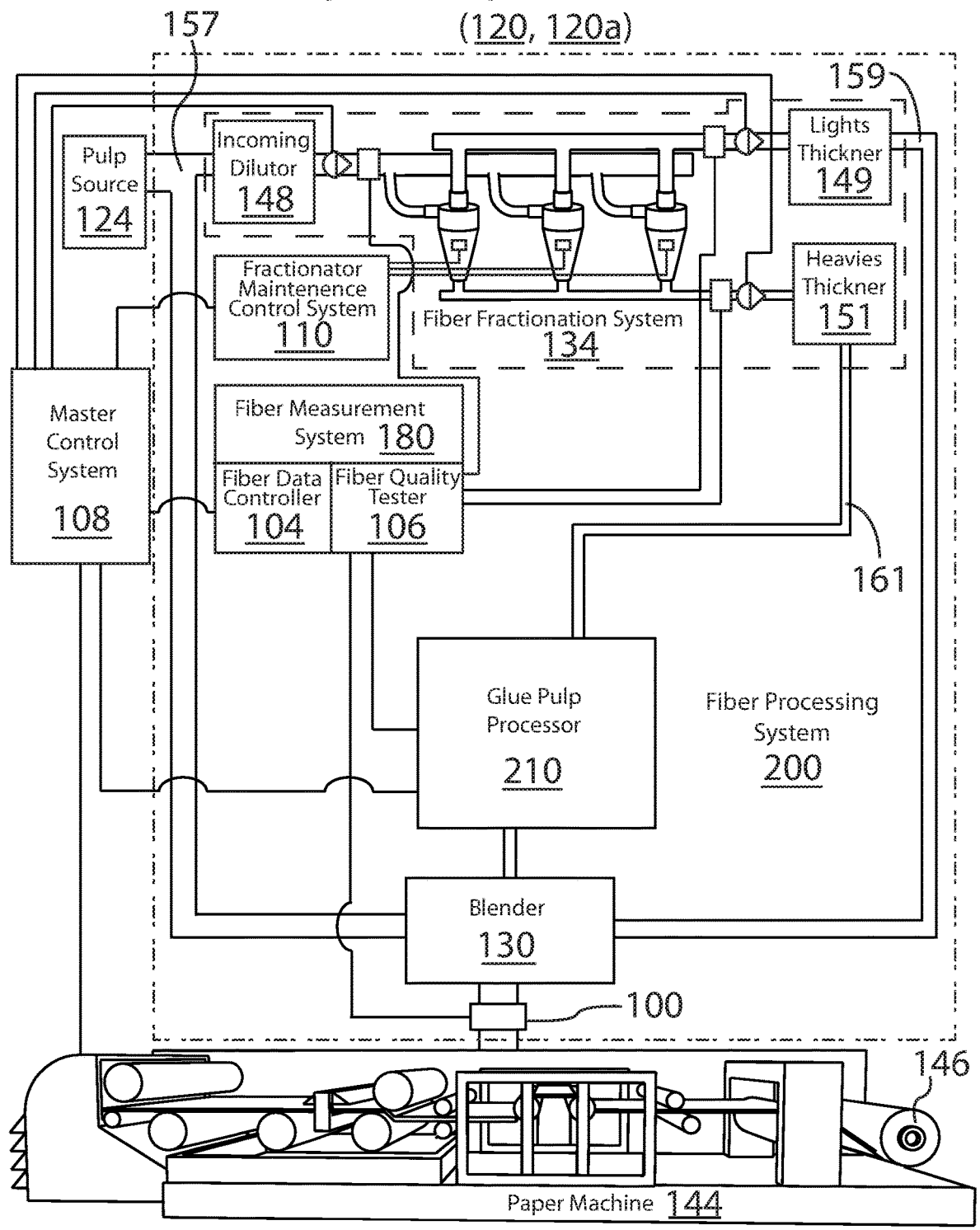
FIG. 21 is a schematic diagram of an exemplary deployment of the system for engineering fibers to improve paper production as shown in FIG. 1 now illustrating the integration of a glue pulp processor.
Figure 22:
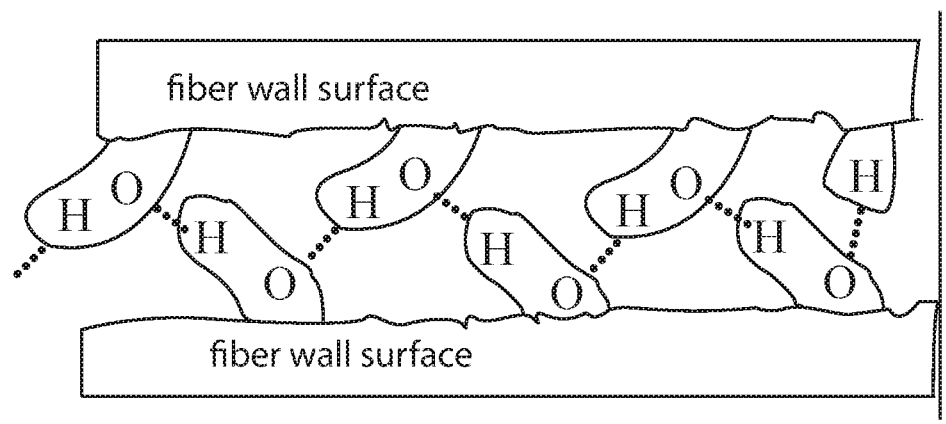
FIG. 22 is a schematic diagram showing the chemistry of bonding between fiber wall surfaces when making paper using the system of FIG. 21.
Figure 23:
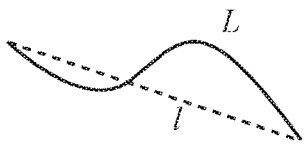
FIG. 23 is a formula definition of curl relating to one aspect of the invention embodied by the system in FIG. 21.

The limitations of the conventional system discussed above are eliminated by new paper making system 120, FIG. 21, that uses fiber processor system 200. The purpose of fiber processing system 200 is unique in that the system can create optimized bonding material in the form of glue pulp. This glue pulp is made for the sole purpose of generating bonding material. Glue pulp does not need to provide structure to the paper so there is no operational compromises between generating bonding and structural material. Glue pulp is generated using much higher refining energy levels than conventional refining. The higher refining energy levels produce optimum surface area with a high percentage of curl in the 0.2-0.5 mm fiber length fraction. In preferred embodiment, glue pulp supplies all of the bonding material needed within a paper mill. Producing a single source of bonding material promotes control and automation throughout the paper mill.

Figure 24:
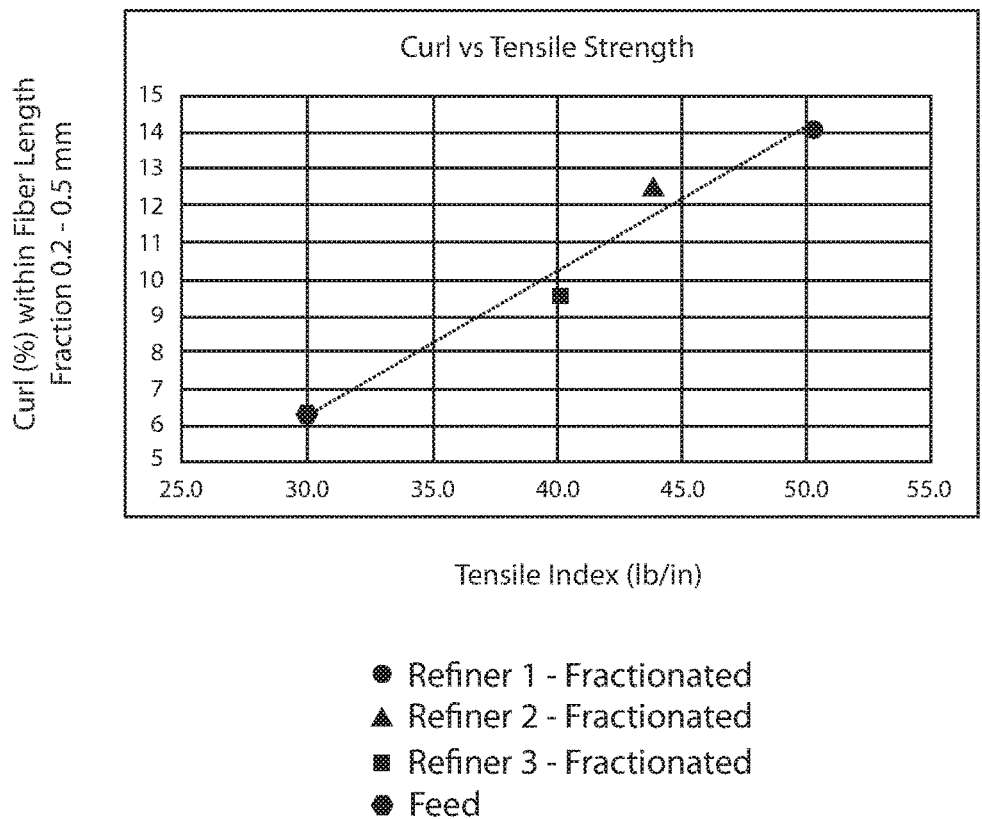
FIG. 24 is data obtained using the system in FIG. 21 defining critical percentages of curl for one embodiment of the invention.

Glue pulp is defined as follows. Glue Pulp is a pulp that supplies all the refiner induced bonding material to make a targeted grade of paper or board. Bonding material are cellulose elements that support many more available hydrogen bonding sites than is present in conventionally refined pulp, FIG. 22. More surface area is directly correlated with more available hydrogen bonding sites. Glue pulp is a pulp with maximized surface area and a balance between fibrillated structural elements to connect across fiber groups and fibrillated fines material to connect fibers to fibers. Glue pulp is not "enhanced fibers" as disclosed in U.S. Pat. No. 9,879,361 to Pande, which is incorporated herein by reference. Pande teaches peeling fiber surfaces to create more attached surface area. This creates more fibrils attached to the surface of a fiber, but the created fibrils will not be available to relocate among unrefined fibers to generate hydrogen bonds. Glue pulp is also not cellulosic nano fibrils (CNF) from as disclosed in U.S. Patent Publication 2017/0073893 to Bilodeau et al., which is incorporated herein by reference. Bilodeau teaches using high specific edge load for fiber cutting for the first refiner and low specific edge load for a second refining step for brushing the cut fibers to makes CNF with an average fiber length between 0.2-0.5 mm. Bilodeau further teaches that a fiber processed to an average fiber length of 0.2 to 0.5 mm will have an optical fines content of between 70-90%. Optical fines are cellulosic particles less than 0.2 mm. Bilodeau's process does not create glue pulp because the nature of the fibrils released by mechanical action will not provide the necessary length to connect unrefined fibers efficiently. In contrast to the above noted prior art processes, the present invention increases the curl of structural cellulosic elements. Curl is the ratio of actual fiber length to projected fiber length, FIG. 23. Increased curl implies longer and thinner fibrils are being generated. In an experiment to define the properties of glue pulp, three different refiners were used to produce the glue pulp—a valley beater, a high shear dispersion mill, and a series disc refiner. The feed and resulting glue pulps were measured optically. Each glue pulp was blended 10% with 90% feed pulp. Handsheets were generated and tested. FIG. 24 shows that increasing the curl of fibers between 0.2 and 0.5 mm increases the tensile strength of paper fabricated from those fibers. It is critical that the glue pulp fiber length fraction in the range of 0.2-0.5 mm have curl (%) that is at least 30%, preferably to 50%, ideally above 50% from the feed.

Figure 25:
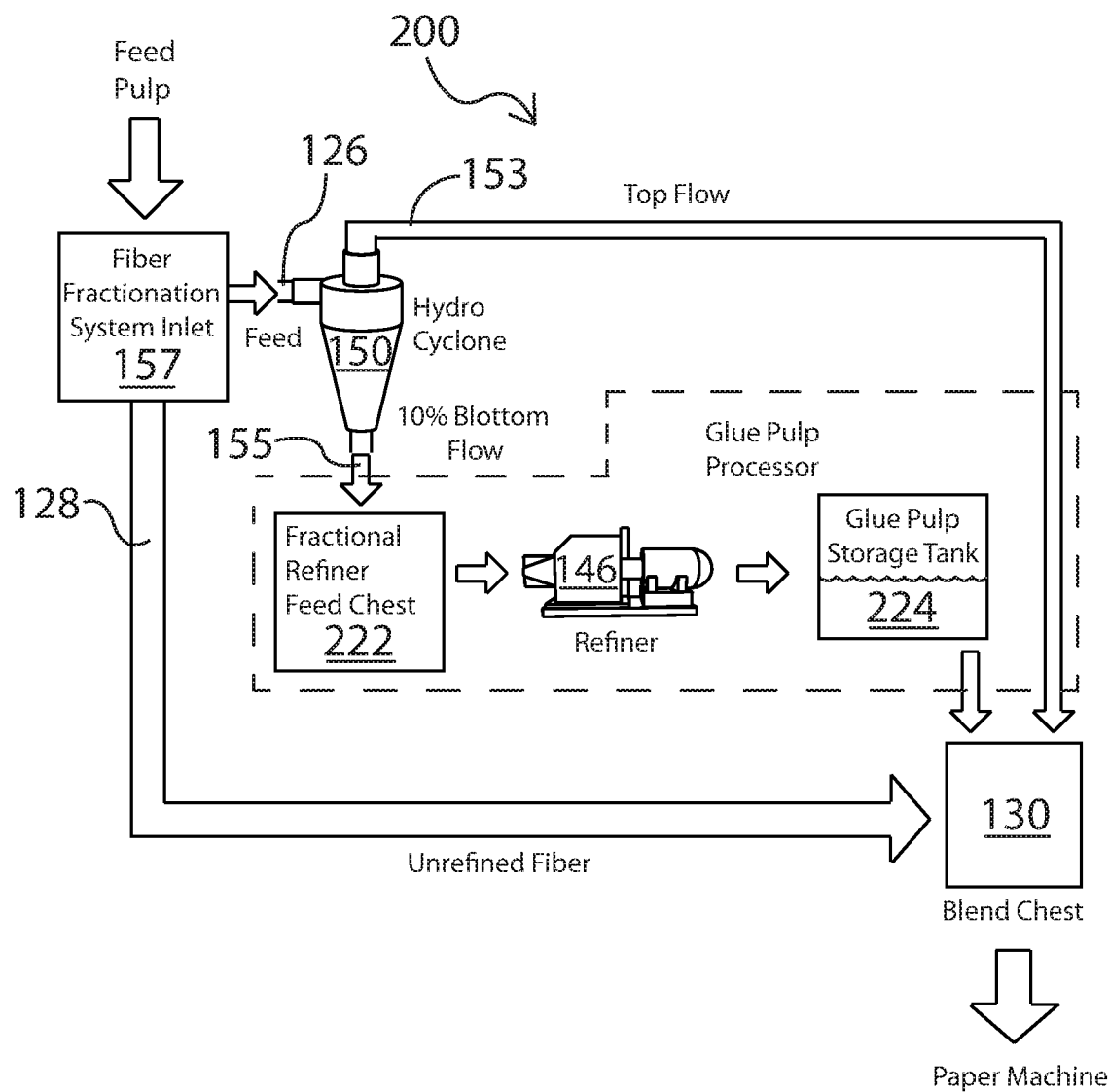
FIG. 25 is a schematic diagram of the fiber processing system of the system shown in FIG. 21.

Fiber processing system 200 for making glue pulp, FIG. 25, comprises a fiber fractionation system inlet 157 that splits incoming cellulosic fibers 118$a$ into an original portion 128 and a fractionable portion 126, the original portion and the fractionable portion having substantially the same composition. Original portion 128 is then processed through fractionator 134 (shown as a hydrocyclone 150) to fractionate original fibers 118a of fractionable portion 126 into a heavies fraction 155 having heavies fibers 118c and a lights fraction 153 having lights fibers 118b. Fiber processor system 200 further comprises a refiner feed chest 222, refiner 136 glue pulp storage tank 224. Heavies fibers 118c are stored in refiner feed chest 222, refined in refiner 136 and refined heavies fibers 118d stored in glue pulp storage tank 224. Fiber processing system 200 further comprises a blender 130 for combining original fibers 118a, fibers 118d and optionally lights fibers 118b. The processing of heavies fibers 118c, to make glue pulp 205, takes place within glue pulp processor 210. The details of system (120, 120a), and how the glue pulp processor 210 is integrated within that system, is shown in FIG. 21. Heavies fibers 118c may be processed through several types of glue pulp processors (210a, 210b and 210c).

Figure 26:
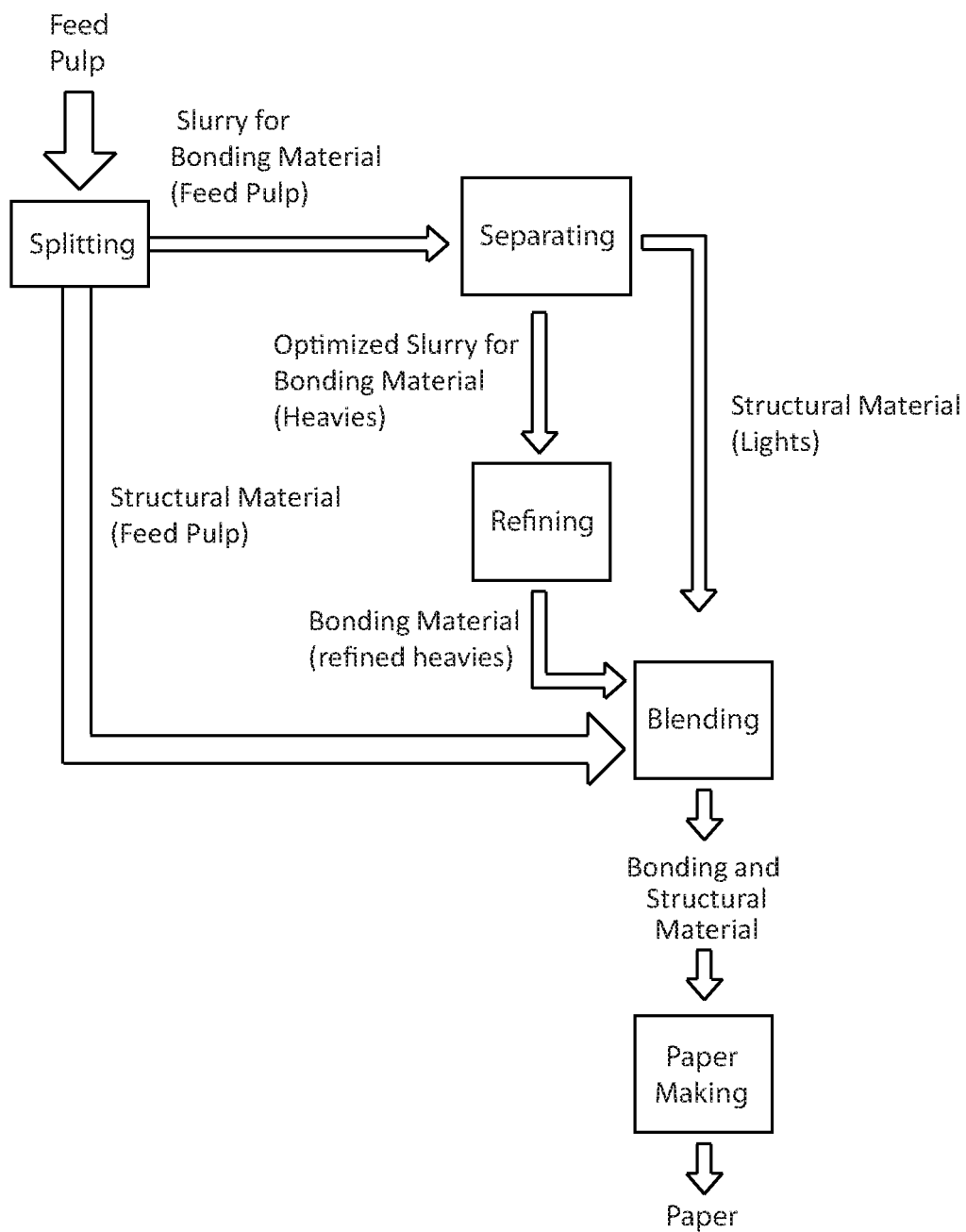
FIG. 26 is a block diagram for the process flow associated with the system for engineering fibers of FIG. 25.

The process flow for fiber processing 200, FIG. 26, shows feed pulp entering the system together. The process involves splitting the feed pulp containing both structural material and bonding material into two portions. Only a small portion of the original feed pulp is processed through the separating step. In one embodiment separation involves the use of hydrocyclones, where optimized slurry (heavies) for bonding material is separated from structural material (lights). The process further involves refining the optimized slurry to create bonding material as refined heavies. The process then involves blending varying amounts of original structural material, lights structural material and optimized bonding material to create an optimized slurry. Paper making then occurs by blending the glue pulp bonding and structural material to make paper products.

Using new fiber processing system 200, the generation of bonding material is separated from those fibers that will provide the structural integrity of the paper. Fiber processing system 200 generates bonding material from only a small portion of the feed pulp allowing most of the feed pulp to maintain its structural integrity. The remaining structural material can independently supply the necessary water removal characteristics and contribute to sheet structure. So instead of refining all fiber flows to generate bonding material while maintaining structural integrity, the bonding material is produced separately and then reintroduced. This new fiber processing system 200 and resulting process allows for generating ideal bonding material instead of compromising to maintain drainage and bulk physical properties in the same action of refining. In this fiber processing system 200, blending of glue pulp is used to accommodate for changes in grades, paper machine operations and reel quality. This bonding material, or glue pulp, is a one step process which eliminates the need to refine any other fiber flow for the generating of bonding material.

Figure 28:
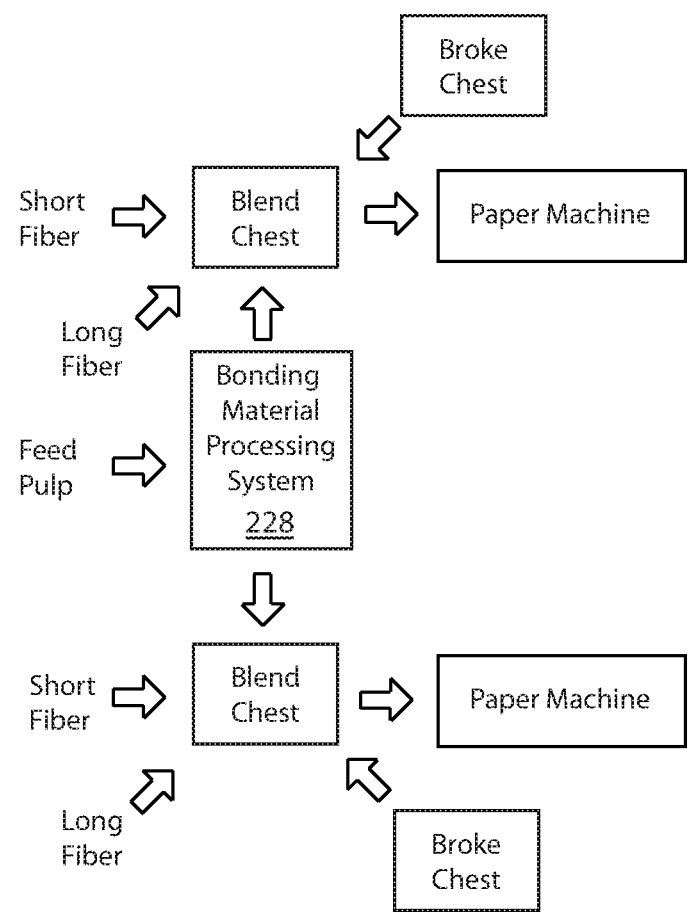
FIG. 28 is a schematic diagram showing new processing within a paper mill using the system in FIG. 1, FIG. 14 or FIG. 21.
Figure 29:
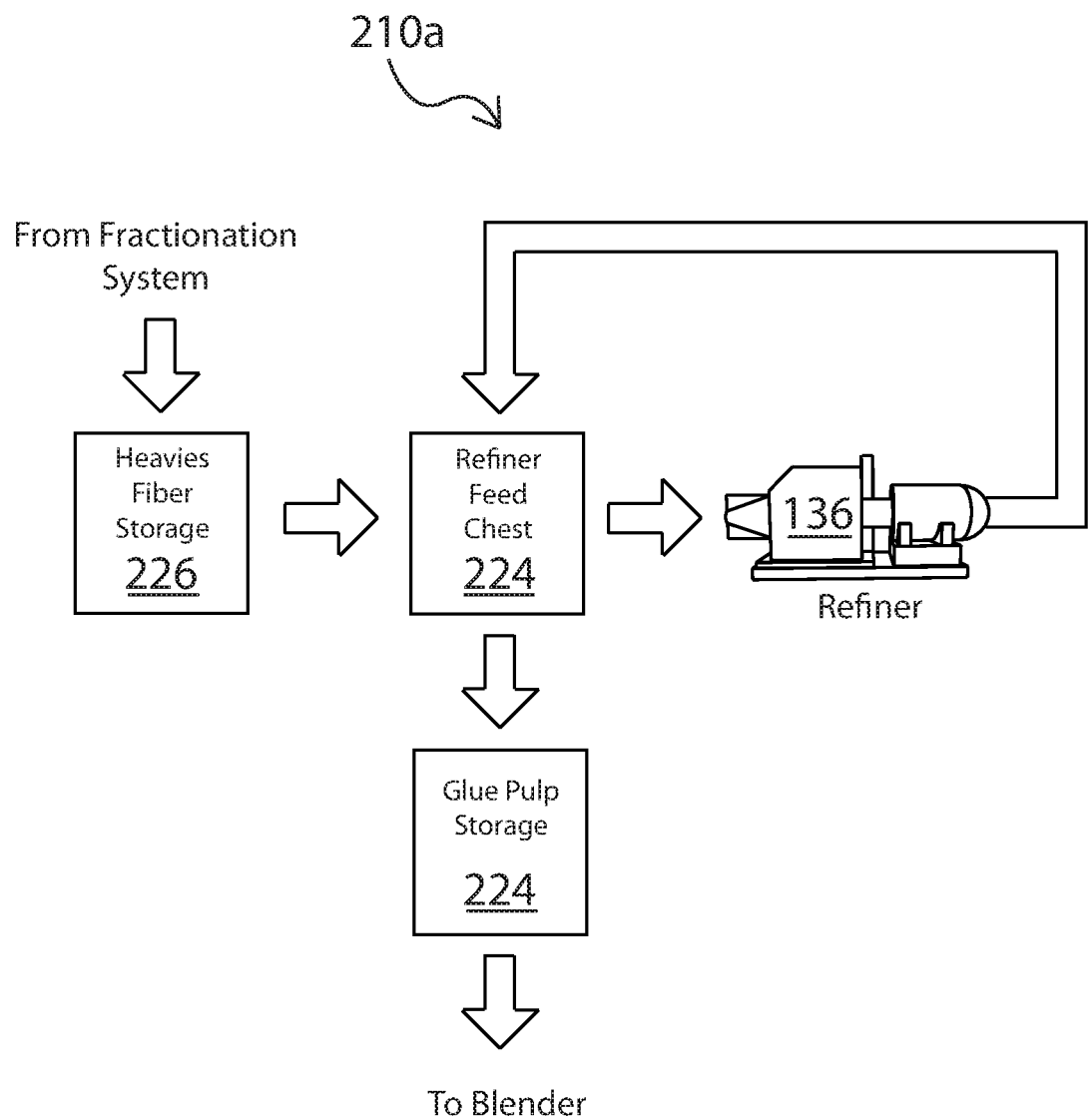
FIG. 29 is a schematic diagram of an embodiment for a batch glue pulp processor for the glue pulp processor in FIG. 21.

Instead of two or three refining processes needing to be adjusted to accommodate feed pulp variability, paper machine variability and reel quality variability there is now only one refining process and this process is adjusted to target fiber properties. The new single process flow for generating bonding material can change the way that paper mills are configured. A comparison of a conventional paper mill with a paper mill configured to run with the new system 120 is represented in FIGS. 27 and 28, respectively. The new fiber processing configuration is a much simpler system that provides for the removal of many of the extra refining steps for generating bonding material required in conventional papermaking. Conventional paper mills currently have a refining strategy that needs to accommodate for the pulp quality variation, that strategy becomes more complicated with each additional refining step. The new single process flow for generating bonding material simplifies the accommodation for pulp quality variability by decreasing the refining steps and significantly reducing the fibers that need to actually be refined for bonding material. FIG. 28 shows that feed pulp is fed to a single bonding material system 228 for creating glue pulp. The glue pulp can be delivered to different blend chests. In each blend chest, glue pulp is mixed with structural portions such as short fiber, long fiber and broke. The new single process for generating bonding material using bonding material processing system 228 can use a system such as 120a or 120b to make the bonding material.

Glue pulp processor 210 is central to the fabrication of high quality bonding material. Glue pulp processor 210 may take several forms (210a, 210b, 210c). In one embodiment, FIG. 29, glue pulp processor A 210a is a batch system having a single refiner feed chest 222 feeding and receiving fibers to and from a single refiner 136. Heavies fibers 118c from fractionation system 134 are first kept within a heavies fiber storage tank 226 where the heavies fibers are then fed as a batch to refiner feed chest 222. From the refiner feed chest 222 all of the fibers are sent through refiner 136. Refined fibers are recirculated back to the refiner feed chest 222. The fibers are sampled and then tested by a fiber property measurement system 180 to determine if target fiber properties have been met. If the target fiber properties have been met, refined fibers 118d are sent to glue pulp storage tank 224 to be held prior to blending. If the specific fiber properties have not been met, a portion or all of the fibers are sent through refiner 136 for more refining and then returned to refiner feed chest 222 where the fibers are again sampled and tested by fiber property measurement system 180 to determine if specific fiber properties have been met. This process continues until the specific fiber properties have been met. The contents of refiner feed chest 222 are passed on to glue pulp storage tank 222 and a new set of heavies fibers 118c feed to the refiner feed chest 222.

Figure 30:
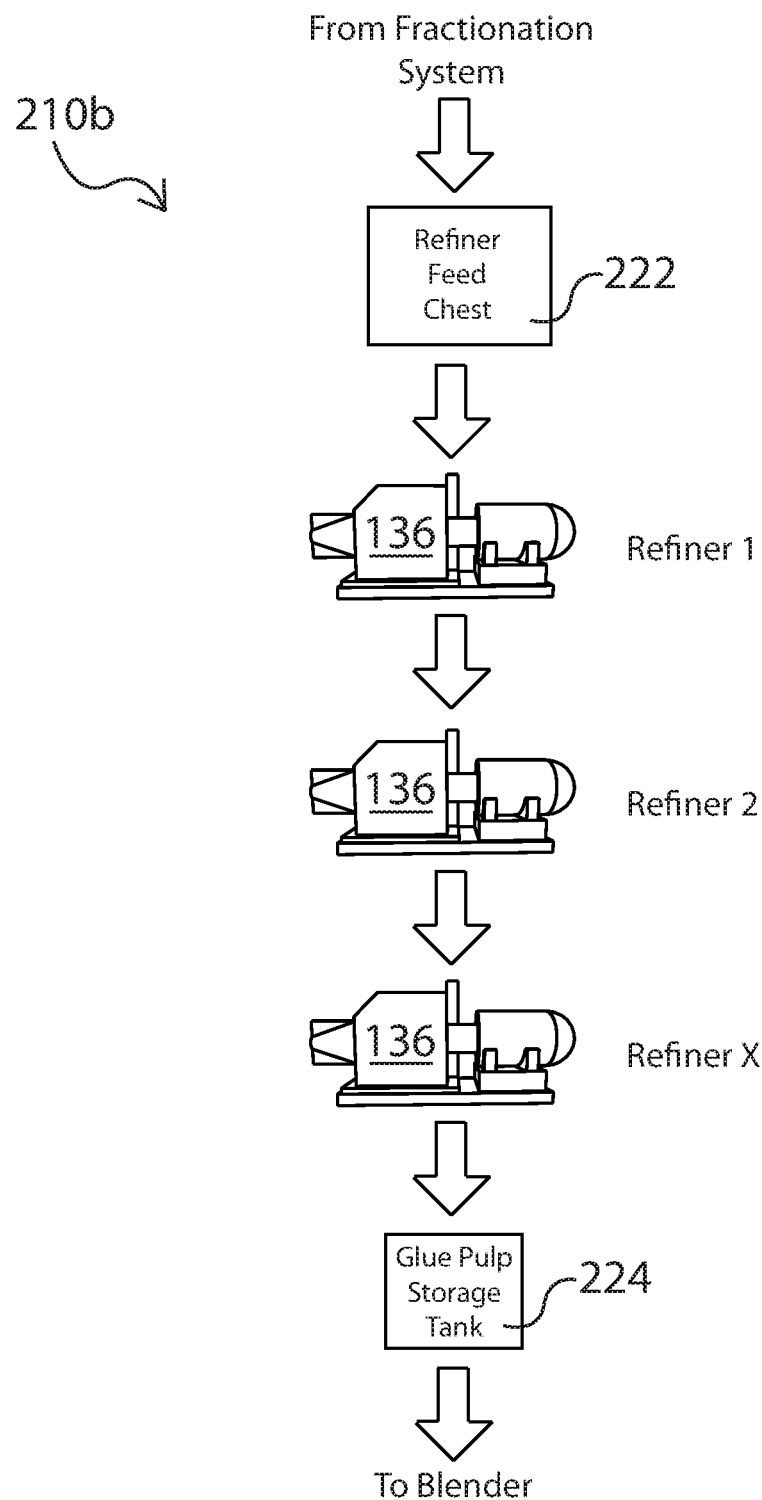
FIG. 30 is a schematic diagram of an embodiment for a series glue pulp processor for the glue pulp processor in FIG. 21.

In one embodiment, FIG. 30, glue pulp processor B 210b is a series system having a plurality of refiners 136. Heavies fibers 118c from fractionation system 134 are stored within refiner feed chest 222. From the refiner feed chest 222 all of the fibers are sent through refiner 1, then refiner 2, then refiner X. The fibers are sampled after refiner X and then tested by a fiber property measurement system 180 to determine if target fiber properties have been met. If the specific fiber properties have been met, refined fibers 118d are sent to glue pulp storage tank 224 to be held prior to blending. If the specific fiber properties have not been met, then adjustments to refining are made.

Figure 31:
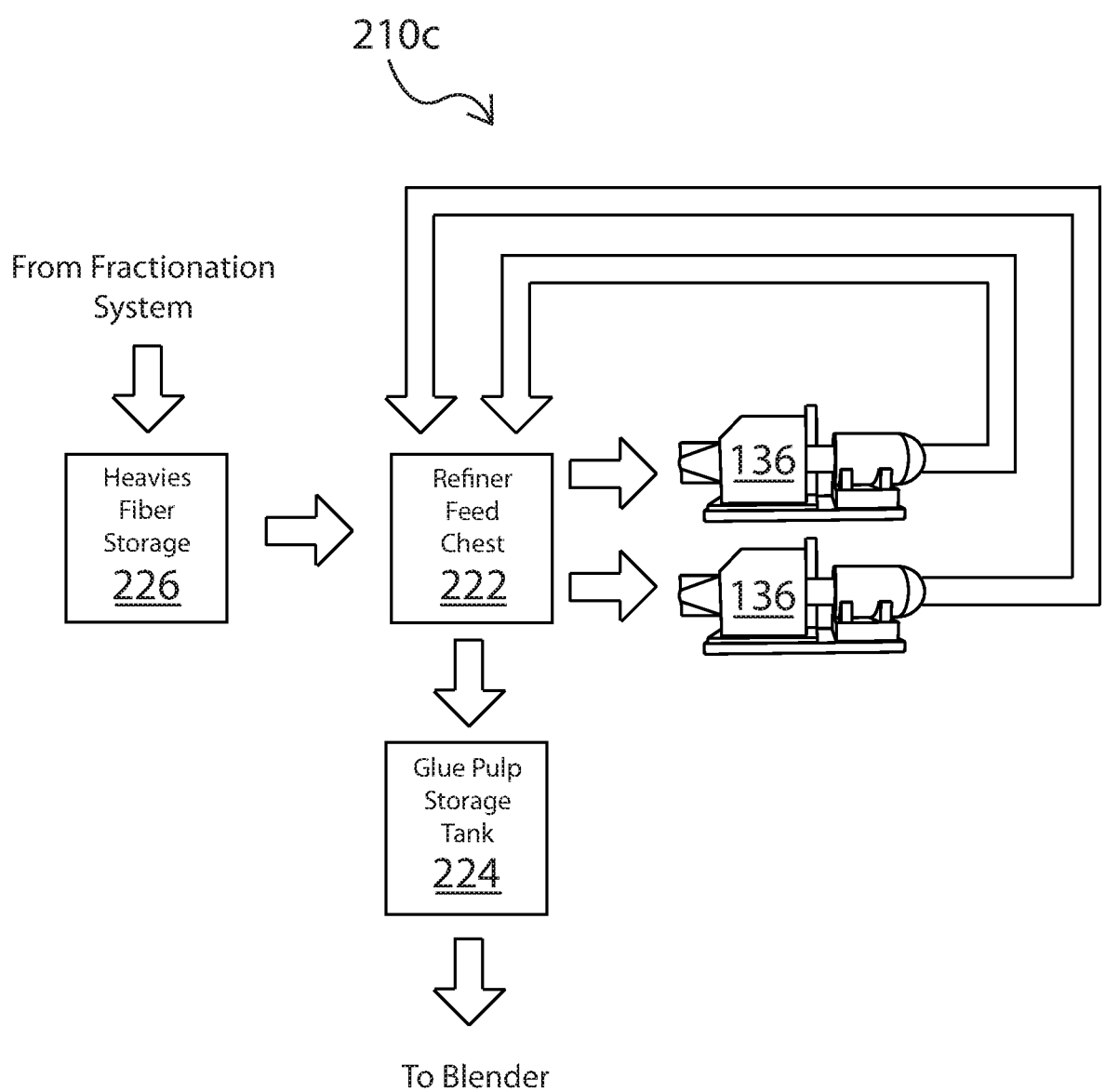
FIG. 31 is a schematic diagram of an embodiment for a parallel glue pulp processor for the glue pulp processor in FIG. 21.

In one embodiment, FIG. 31, glue pulp processor C 210c is a parallel system having a plurality of refiners 136 feeding a single refiner feed chest 222. Heavies fibers 18c from fractionation system 134 are first kept within a heavies fiber storage tank 226 where the heavies fibers are then fed as a batch to refiner feed chest 222. From the refiner feed chest 222 a portion of the fibers is sent through each refiner 136. Refined fibers are returned to the refiner feed chest 222. The fibers are sampled and then tested by a fiber measurement system 180 to determine if target fiber properties have been met. If the specific fiber properties have been met, refined fibers 118d are sent to glue pulp storage tank 224 to be held prior to blending. If the specific fiber properties have not been met, a portion or all of the fibers are sent through one or more of the plurality of refiners 136 for more refining and then returned to refiner feed chest 222 where the fibers are again sampled and tested by fiber property measurement system 180 to determine if specific fiber properties have been met. This process continues until the specific fiber properties have been met. The contents of refiner feed chest 222 are then passed on to glue pulp storage tank 222 and a new set of heavies fibers 118c feed to the refiner feed chest 222.

In the present invention there are various methods for optimizing paper machine operation and paper properties using glue pulp. In one embodiment the method comprises providing original pulp, glue pulp held in glue pulp storage and comprised of refined heavies fractionated from the original pulp, and a blender. The method involves blending the original pulp and the glue pulp mixture in the blender, and then adjusting the percentage of glue pulp in the pulp mixture to optimize the paper properties and paper machine operation while maintaining a targeted amount of blended pulp mixture. The method may further comprise providing lights fractionated from the original pulp; blending the original pulp, the glue pulp and the lights to create the pulp mixture; and then adjusting the percentage of glue pulp in the pulp mixture to optimize the paper properties and paper machine operation while maintaining a targeted amount of blended pulp mixture.

In another embodiment the method comprises providing a fractionable portion and an original portion that are substantially the same composition. The fractionable portion is fractionated into a heavies fraction having heavies fibers and a lights fraction having lights fibers. The heavies are refined to produces glue pulp which may be held in glue pulp storage and then blended with the original portion and an amount of glue pulp to create a recombined slurry. It is critical to have the fractionable portion be 5-30 percent of the original portion. After fractionation and refining this provides a critical amount of glue pulp in the range of 2.5-28.5 percent of the original portion. If under 2.5 percent glue pulp, there is insufficient bonding material to obtain strength. If over 28.5% glue pulp then the negative economic consequence of loss of drainage due to lack of structural material will overcome the benefit of increases in paper properties.

During processing (Example 5) system 120, 120a can be run in a static mode where the amount of fiber flowing through each portion of the system is a constant predetermined amount. FIG. 32 illustrates step-by-step processing for such an embodiment showing the amount of fiber flow in each portion of system 120. When operating in this mode, previous experimental data is used to predetermine what the fiber flow will be through each portion of system 120. In step 1—100-percent of original fibers 118a suspended in a fluid enters the system as original slurry. Step 2—the slurry is split; 20-percent goes to fiber fractionation system 134 as fractionable portion 126 and the other 80-percent (original portion 128) is redirected to blender 30. Step 3—fractionation occurs. The fractionable portion 126 is introduced into the fractionators and is separated/fractionated by the fractionators into 10-percent heavy fibers 118c (heavies fraction 155) and 10-percent light fibers 118b (lights fraction 153). The 10-percent lights fraction is directed to blender 30. Step 4—Glue pulp processing occurs to maximize bonding material. Here the 10-percent of heavies fibers is directed to and processed by refiner 136. Step 5—blending the three fiber types: original fibers 118a, light fibers 118b and refined heavy fibers 118d are recombined and blended together. Step 6—the optimized slurry is achieved and sent to paper machine 144 to be turned into an optimized paper, board or tissue product 146. Percentages stated above are only for this one illustrative example; however these percentages should not be considered limiting and other percentages may be used.

During processing (Example 6) system 120, 120a can be run in a dynamic mode where the amount of fiber flowing through each portion of the system is adjusted as measurements come in and are analyzed by master control system 108. FIG. 32 illustrates step-by-step processing for such an embodiment showing ranges for the amount of fiber flow in each portion of system 120 at any given time. In step 1—100-percent of original fibers 118a suspended in a fluid enters the system as original slurry. Step 2—the slurry is split within the given ranges depending on what type of paper is to be manufactured and feedback information gathered in the rest of the process flow. For example, fiber in the range of 5-30 percent goes to fiber fractionation system 134 as fractionable portion 126 and the other 70-95 percent (original portion 128) is redirected to blender 130. Step 3—fractionation occurs. The fractionable portion 126 is introduced into the fractionators and is separated/fractionated into 2.5-28.5 percent heavy fibers 118c (heavies fraction 155) and 0.25-15.0 percent light fibers 118b (lights fraction 153). The 0.25-15.0 percent lights fraction is directed to blender 130. Step 4—glue pulp processing occurs to maximize bonding material, the 2.5-28.5 percent of heavies is directed to and processed by refiner 136. Step 5—glue pulp storage involves storing the fiber and then drawing upon the stored fibers as needed to mix the ideal fiber composition. Step 6—blending the three fiber types: original fibers 118a, light fibers 118b and refined heavy fibers 118d are recombined and blended together in any percentage that is required to produce the optimized slurry. Step 7—the optimized slurry is achieved and sent to paper machine 144 to be turned into an optimized paper, board or tissue product 146. Percentages stated above are only for this one illustrative example; however these percentages should not be considered limiting and other percentages may be used.

The critical fiber engineering steps of splitting, fractionation, glue pulp production (refining) and blending have been experimentally verified for fiber processing system 200. The first verification show hydrocyclone operating conditions and output fiber properties. The fractionation of the "light" fraction from the "heavy" fraction was accomplished using reverse cleaner principles. A high yield kraft pulp was fractionated using a hydrocyclone with a feed consistency of 0.5% an input pressure of 32 psig, a pressure drop of 25 psig and a flow rate of 73 gallons a minute. These conditions are outlined in FIG. 34. These conditions, processed through this particular hydrocyclone, produced a top flow consistency of 0.18%, a bottom flow consistency of 3.03%, a mass balance split of 31% to top flow and 69% to bottom flow and a volumetric balance split of 89% to top and 11% to bottom flow. This treatment produced fractioned pulp. Three samples, feed—bottom flow—top flow, were measured optically to generate fiber quality data. The bottom flow had 199% less optical fines than the top flow, 185% less fibers between 0.2-0.5 mm, 75% less fibers between 0.5 mm and 1.0 mm, and an increase in fibers between 1.5-2.5 mm and 2.5-5.0 mm. Also the average fiber wall thickness was increased by 9% and fibers, with a fiber wall thickness greater than 3.2 µm increased by 23%. The pulp exiting the bottom flow of the hydocyclone presented the best fibers for glue pulp production because the fiber length distribution was reduced and these fibers are best suited to generate long thin unattached fibrils when refined. The bottom flow fiber quality characteristics include a decrease in fines, small fiber (0.2-1.0 mm) and thinner fiber walled pulp according to the table in FIG. 35.

The second verification shows the glue pulp fiber properties made from fractionated feed pulp. Glue pulp production was accomplished by using the bottom flow of the fractioned pulp to become the feed to refining. Refining treatment liberates surface area by mechanical action. This treatment produced cellulose elements with increased fines, increased smaller fibers, increased curl for the fiber length fraction between 0.2 and 0.5 mm, increased crill bonding area and decreased long fibers according to the table in FIG. 36.

The third verification is to show the superior paper properties of handsheets when produced from blending unrefined feed pulp with glue pulp. Blending was accomplished in a blender. The glue pulp that was produced by fractionation is then blended back with the original feed pulp at a ratio of 90% feed and 10% glue pulp. This blended pulp was then measured for Canadian Standard Freeness (CSF), made into 120 g/m² handsheets and tested for several physical properties. These resulting physical properties and CSF were compared with the reference condition of pulp fibers taken from the stuff box in the paper machine system. Experimental results were obtained for the static process above, FIG. 32. These results, FIG. 37, show the improvements obtained with the invention over conventional processing for static processing. Strength properties (tensile, stretch, STFI, burst) are increased with increasing Bulk and minimal impact on drainage (CSF).

A comparison was made between glue pulp produced from fractionated and unfractionated feed pulp. Both feed and bottom flow fractionated pulp were refined in a laboratory refiner at increasing levels of energy (0-50 horse power day/ton, in 10 hpd/t increments). The resulting pulps, starting with unrefined feed, were measured optically to determine fiber length distribution as shown in FIG. 38. The fractionated pulp is much more responsive to mechanical treatment as evidenced by the changes in fiber length distribution as energy was applied to both the unfractionated feed and fractionated pulp. Fractionation maximizes the efficiency of energy transfer from refiner to fiber. Maximizing energy transfer supplies refiner feed fiber that is superior as a bonding material. Glue pulp can be produced without fractionation. However fractionation provides a superior feed pulp for glue pulp production as indicated in the experiment below.

Figure 39:
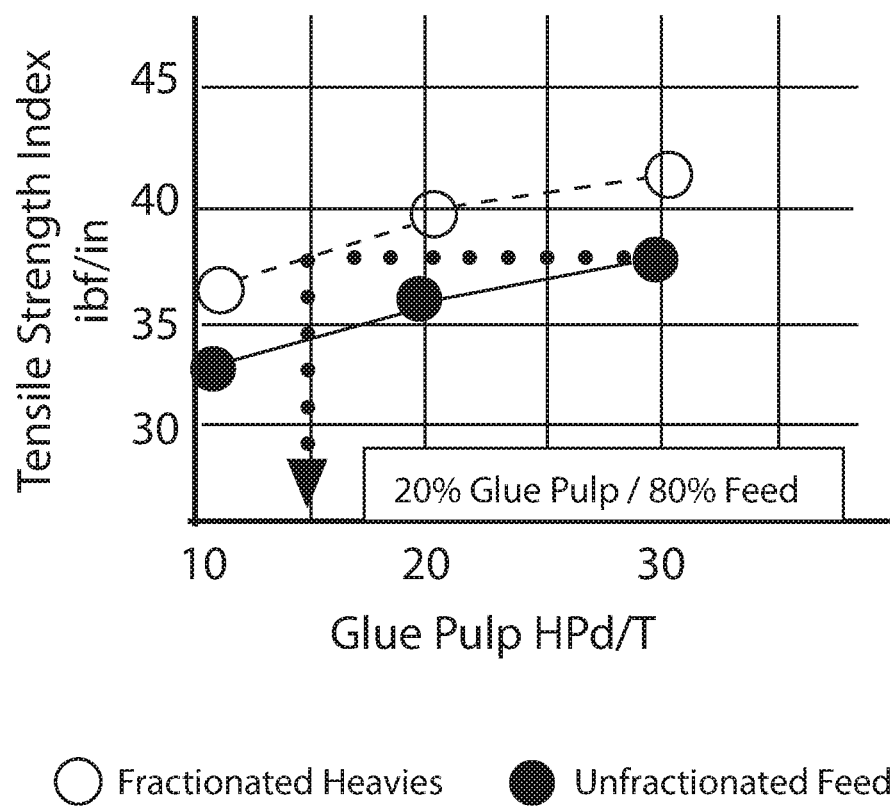
FIG. 39 is an example of strength comparison between fractionated and unfractionated pulp using the system of FIG. 21.

This difference in how fractionated and unfractionated pulp responds to refining energy also is seen in difference to paper properties. Here both fractionated and unfractionated pulp were refined at 10, 20, 30, 40, 50 horse power day/ton energy levels in a lab disc refiner, to become glue pulp. This glue pulp was blended with unfractionated, unrefined feed pulp to make 120 g/m2 handsheets comprising of 80% feed and 20% glue pulp. These handsheets were then tested for tensile strength and a tensile index result derived. Tensile is known to be a good proxy for bonding strength. The difference between producing glue pulp from fractionated versus unfractionated feed pulp is shown in FIG. 39. In this example unfractionated glue pulp requires twice the energy to generate comparable tensile strength index results as fractionated pulp.

The blending range of 2.5%/97.5% to 28.5%/71.5% was determined to be important. This range was derived by balancing three considerations: (1) costs of generating glue pulp, (2) likely impact of glue pulp on blended pulps water removal characteristics and (3) the benefits of glue pulp addition to sheet structure. For any given grade the blending range closer to +/−2% from target blend percent. For any given paper machine, the grade structure will also incorporate a blending range less than +/−10% from average blending percentage. Conventional paper making uses blending as a way to introduce longer versus shorter fiber, recycled versus virgin and dry waste (broke) versus feed pulp. In conventional papermaking, all components are refined to generate bonding sites while maintaining structural integrity for drainage and some of the reel properties. While conventional blending also incorporates the net effect of differential bonding contribution, balancing that contribution is only assessed by its effects on drainage (freeness) and paper machine reel properties rather than target fiber quality.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. A method for optimizing paper machine operation and paper properties, comprising:
   a) providing original pulp;
   b) splitting the original pulp into a fractionable portion and an original portion that are substantially the same composition;
   c) fractionating the fractionable portion into a heavies fraction having heavies fibers and a lights fraction having lights fibers;
   d) refining the heavies fibers to produce a glue pulp; and
   e) blending the original portion and an amount of glue pulp to create a recombined slurry.

2. The method as recited in claim 1, wherein during said refining step the glue pulp has refined fibers within a length of 0.2-0.5 mm, wherein those refined fibers have a curl (%) that is at least 30% higher than the curl (%) of original pulp also within a length of 0.2-0.5 mm.

3. The method as recited in claim 1, wherein the fractionable portion is 5-30 percent of the original portion.

4. The method as recited in claim 1, wherein the amount of glue pulp is 2.5-28.5 percent of the original portion.

5. The method as recited in claim 1, wherein during said refining step the glue pulp has refined fibers within a length of 0.2-0.5 mm, wherein those refined fibers have a curl (%) that is 30% to 50% higher than the curl (%) of original pulp also within a length of 0.2-0.5 mm.

6. The method as recited in claim 1, wherein during said refining step the glue pulp has refined fibers within a length of 0.2-0.5 mm, wherein those refined fibers have a curl (%) that is greater than 50% higher than the curl (%) of original pulp also within a length of 0.2-0.5 mm.

* * * * *